(12) United States Patent
Cole

(10) Patent No.: US 7,571,132 B2
(45) Date of Patent: Aug. 4, 2009

(54) FORFAITING TRANSACTIONS

(75) Inventor: Tara Kimbrell Cole, Singapore (SG)

(73) Assignee: Global Trade Finance Network Pte. Ltd., Singapore (SG)

( * ) Notice: Subject to any disclaimer, the term of this patent is extended or adjusted under 35 U.S.C. 154(b) by 1594 days.

(21) Appl. No.: 10/052,419

(22) Filed: Jan. 18, 2002

(65) Prior Publication Data

US 2003/0140005 A1 Jul. 24, 2003

(30) Foreign Application Priority Data

Dec. 20, 2001 (AU) .................................... PR9695

(51) Int. Cl.
*G06Q 40/00* (2006.01)
(52) U.S. Cl. ............................. 705/37; 705/38; 705/39; 705/40
(58) Field of Classification Search .............. 705/35–40
See application file for complete search history.

(56) References Cited

U.S. PATENT DOCUMENTS

| | | | | |
|---|---|---|---|---|
| 5,717,989 | A | * | 2/1998 | Tozzoli et al. .................. 705/37 |
| 6,629,081 | B1 | * | 9/2003 | Cornelius et al. ............. 705/30 |
| 7,155,409 | B1 | * | 12/2006 | Stroh ........................... 705/37 |
| 2002/0103754 | A1 | | 8/2002 | Dunlop |

FOREIGN PATENT DOCUMENTS

WO WO 00/38095 A2 6/2000
WO WO 00/63816 A2 10/2000

OTHER PUBLICATIONS

Kendall P. Hill, Murat N. Tanju, Forfaiting: What Finance and Accounting Managers Should Know, Financial Practice & Education, Fall/Winter, 1998, p. 53-58.*
Hanson, Fay; FCIB's 11th annual global conference: Emerging technologies in global credit and finance; Jan. 2001; Business Credit; v103n1; pp. 61-64.*
Simpson, Paul & Wesley, Charles; What's ahead for top trade banks?; Jun. 2000; World Trade; v13n6; pp. 78-81.*
Lustig, Carole; Forfaiting: A European customer finance technique comes to the U.S.; Nov./Dec. 1998; Business Credit; v100n10; pp. 26-29.*
International Search Report, mailed Feb. 6, 2003, for PCT/AU02/01726 ( 2 pages).
International Preliminary Examination Report, dated Jun. 11, 2003, for PCT/AU02/01726 (3 pages).
David Clarke, "E-Export Finance is No Dot-Com Wonder but Wonder What EDC Will Make of It?," Policy Options, Sep. 2001 (available at: http://209.85.175.104/search?q=cache:9eiXz5p1NzEJ:www.irpp.org/po/archive/se) (7 pages).

(Continued)

*Primary Examiner*—Stefanos Karmis
*Assistant Examiner*—Samuel S. Weis
(74) *Attorney, Agent, or Firm*—Finnegan, Henderson, Farabow, Garrett & Dunner, L.L.P.

(57) ABSTRACT

This invention concerns forfaiting transactions. In particular it concerns methods of operating a computerized forfaiting exchange to develop forfaiting transactions. In another aspect it concerns a computerized forfaiting exchange. The exchange allows the parties to screen counter party types and asset types, to make the transactions more efficient. It also able to provide assistance in ensuring appropriate documentation is used and is properly completed.

22 Claims, 5 Drawing Sheets

OTHER PUBLICATIONS

"Deutsche to provide Digital Warehouse and escrow facilities for ITFex," Trade Finance Magazine, Apr. 2001 (available at: http://www.tradefinancemagazine.com/default.asp?page=7&PubID=43&ISS=11504&SID=454847) (1 page).

"Forfaiting fights on," Trade & Forfaiting Review, Aug. 2001, vol. 4, Issue 10 (available at: http://www.tfreview.com/xq/asp/sid.0/articleid.053BD697-02D5-4C33-80FE-3C13F0C69710/eTitle.Forfaiting_fights_on/qx/display.htm) (3 pages).

"People and Places," Trade & Forfaiting Review, Dec. 2000/Jan. 2001, vol. 4 Issue 4 (cover page and pp. 4, 6, 7).

"Cover Story: Forfaiting's Coming of Age," Trade & Forfaiting Review, Dec. 2000/Jan. 2001, vol. 4, Issue 4 (pp. 18-20).

"Blinking in the bright lights," Trade Finance, Mar. 2001 (pp. 37 and 40-43).

Forfaiting Handbook 2002, Editor's Foreword, Foreword, Contents (3 pages).

"Banking on the future of forfeiting," Trade and Forfaiting Review online, Jul. 2, 2001 (9 pages).

"A new game of forfaits," The Economist, Jan. 6, 2001, p. 70 (1 page).

Andy Ripley, "Forfaiting for Exporters," 1996, Contents and Preface. (2 pages).

* cited by examiner

FORFAITING TRANSACTIONS

TECHNICAL FIELD

This invention concerns forfaiting transactions. In particular it concerns methods of operating a computerised forfaiting exchange to develop forfaiting transactions. In another aspect it concerns a computerised forfaiting exchange.

BACKGROUND ART

Forfaiting transactions are complex and not well understood, they are easily confused with other, similar, transactions. The knowledge of how to conduct these transactions is held by few individuals within a small number of financial institutions, and as a result it is not widely available.

Forfaiting specifically addresses cross boarder trade and was designed to facilitate the export of goods to emerging markets and OECD markets. It involves an exporter that wishes to ship goods and an importer that wishes to receive them. The exporter agrees to deferred payment terms, and the importer arranges a deferred payment (aka 'usance' in Asia) letter of credit with a local issuing bank. The letter of credit will expire unless the goods are delivered by its expiry date. If the goods are delivered the letter of credit may be cashed at its maturity date. The local issuing bank seeks payment from the importer.

After delivery, provided the shipping documents are accepted as in compliance with the terms of the letter of credit, and the obligation to pay is accepted or issued by the L/C issuing 'opening' bank, then the exporter has a negotiable instrument that is a trade receivable in the form of a draft, promissory note or other form of documenting a payment obligation which can be held by the exporter until maturity or can be discounted prior to maturity.

An exporter that seeks payment prior to the maturity of the obligation, may sell the obligation say, to a bank or other purchaser or investor, for its net present value. The sale is 'without recourse' which means that the new owner does not look to the exporter or any subsequent holder or seller for payment in the case of default, but rather to the L/C issuing 'opening' bank as obligor or guarantor, and to the primary purchaser as the party is responsible for having done enough due diligence to ascertain if the obligation is or is not fraudulent. Since the beneficiary of the letter of credit is the exporter, the ownership of the payment obligation must be transferred properly. This usually includes the execution of an acceptance or acknowledgment of the assignment of the underlying obligation by the LIC issuing 'opening' bank or other form of obligor (usually the initial guarantor), the exporter and the new purchaser/holder/owner. The new purchaser/holder/owner can subsequently sell the instrument again, and this may create for them an opportunity to generate profit often via an arbitrage based on geographic or other market differences in perspective.

The negotiable instrument is the draft or other form documenting the payment obligation and supported by the L/C or original guarantee—not the L/C itself.

The exporter may put the entire export transaction in the hands of its bank and merely receive an agreed payment upon shipment or delivery of the goods, as called for in the L/C or terms of sale contract. A negotiable instrument arises as a result of the export/import transaction (but only after the goods have been delivered, the documents have been accepted by the L/C issuing bank as incompliance with the terms of L/C, and the acceptance or issuance of the pay obligation by the L/C issuing bank) in the hands of the exporter (unless otherwise specified by the terms of L/C), and is usually held by the exporter's negotiating bank, in compliance with the terms of the L/C or other form of guarantee, issuance or acceptance by the obligor (guarantor) and under authorization by the exporter (unless nominated otherwise in the L/C), and is sold 'without recourse' to the exporter. Care has to be taken to execute the appropriate documents to ensure the exporter and, as the case may be, exporter's bank have a viable negotiating instrument and a viable transfer of ownership of this receivable (obligation). The subsequent forfaiting transactions do not involve the exporter and generally may be carried on without the exporter having any knowledge of them.

This process has a number of benefits for both exporters and importers. For the exporter, it can grant credit (deferred payment terms) to foreign buyers without tying up cash flow or assuming all the risks of possible late payment or default. The exporter may also in this way protect against interest and currency rate movements during the credit period.

The importer deals only with its local bank. That bank is best positioned of any to assess the importer's credit risk and extract payment.

A 'forfaiting transaction' is defined, in this patent, to mean the transfer of ownership of a payment obligation (asset) in which the buyer forgoes any right of recourse to the exporter and subsequent holder or seller in the event that the obligor is unable to meet the payments required by the obligation (except in the case of fraud), where the payment obligation arises directly from a bank guarantee in any form given in the course of an export transaction and thereby resulting in a cross border trade receivable.

Of course, fraud may negate the subsequent transactions.

An example of a forfaiting transaction is as follows:

A letter of credit USD 1,000,000 is purchased at an interest rate of 8% p.a. for the deferred payment period of 360 days and that interest is discounted from the face at the time of purchase at a straight discount. The purchaser (possibly a forfaiter) pays USD 920,000 for the debt obligation and later sells it at 7% p.a. interest for duration of the deferred payment period, receiving USD 930,000. The intention of this transaction is to maximize the use of funds and generate revenue. USD 1,000,000 turned 40 times in a period of one year, assuming the same margins, could generate USD 400,000 in revenue. A counter party engaging in a forfaiting operation views this as a better value proposition rather than utilizing its capital to book assets on its balance sheet. If one were to assume the cost of funds of a traditional lender at 3% p.a. and the interest charged 8% p.a, this same transaction would generate USD 50,000 in revenue.

It is appreciated that forfaiting transactions can take place in connection with other credit enhancement products and or instruments as well as obligations supported by letters of credit. For instance, bills of exchange, drafts drawn under deferred payment (usance) letters of credit, Deferred payment claims with other forms of financial guarantees, drafts or promissory notes that are avalized, drafts and promissory notes with international 'creditability' that are naked, and any of these sometimes together with another form of credit enhancement—that is of course provided the payment obligation results directly from an export transaction.

SUMMARY OF THE INVENTION

The invention is a method of operating a computerised forfaiting exchange to develop forfaiting transactions (as defined) for settlement, comprising the following steps:

Providing a web site accessible via the Internet to sellers and buyers using computers.

Providing a counter party selection document on request to a seller or buyer to view at the web site, where the document contains a list of classes of counter parties together with counter party selection entry facilities.

Permitting a seller to identify classes of buyers with whom they will, or will not, develop a forfaiting transaction, by entering selections on the counter party selection document using the counter party selection entry facilities.

Providing an offer document on request to a seller to view at the web site, where the offer document contains the following items:
  a list of classes of asset together with asset selection entry facilities and asset information entry facilities for entry of details of the asset;
  a list of terms for the offer together with offer selection entry facilities and information entry facilities for entry of details of the offer;
  a list of offer documents to accompany the offer together with offer document selection entry facilities and offer document attachment facilities for attaching copies of offer documents;
  a list of undertakings for the seller to make together with undertaking selection entry facilities and undertaking document attachment facilities for attaching copies of undertaking documents.

Permitting the seller to create an instance of the offer document, by:
  identifying the asset to be offered by using the asset selection entry facilities and asset information entry facilities;
  identifying the terms for the offer by using the offer selection entry facilities and offer information entry facilities;
  identifying the offer documents to accompany the offer by using the offer document selection entry facilities and offer document attachment facilities;
  identifying the undertakings to be made by using the undertaking selection entry facilities and undertaking document attachment facilities.

Permitting the seller to submit an instance of the offer document, so that it becomes available to view by potential buyers from only the classes of buyers identified as being those whom the seller will develop the transaction.

Providing a counter offer document on request to a buyer after they have viewed an offer document, where the counter offer document contains counter offer selection and counter offer information entry facilities for entry of variations to an offer document instance;

Permitting the buyer to create an instance of the counter offer document by entering selections and information using the counter offer selection and information entry facilities, and to submit the counter offer instance, so that it becomes available to the seller;

Providing a counter offer document on request to any party after they have viewed an instance of a counter offer document, where the counter offer document contains counter offer selection and information entry facilities for entry of variations;

Permitting the party to create an instance of the counter offer document by entering selections and information using the counter offer selection and information entry facilities, and to submit the counter offer instance, so that it becomes available to the counter party;

Repeating the last two steps.

Use of the exchange enables the transactions to become accessible and reliable. The independent nature of the exchange creates a trusted medium for developing the transactions for settlement. The exchange provides a step by step process by which the transactions are developed. It may require all the necessary documents to be completed before the next step can be taken, and it may guide the process to the extent of identifying mistakes and even offering corrections. The transaction may continue until all terms are matched. Settlement may then take place at the exchange or by any other suitable means. Where a complete match is not achieved, settlement may still be achieved, say by further off-line negotiation.

The document available at the web site may contain electronic links to independent sources of financial information, this enables the parties to conveniently check financial information such as rates and the standing of the obligor without having to exit the exchange.

Links may also be provided to standardized forms of documents, such as asset defining documents used to support instances of the offer document. This enables the parties to check whether any document offered complies with the standard, and to determine any differences. The differences may be automatically flagged. It also gives the party the option of using the standard documentation, which may ease the subsequent transaction.

Similarly, there may be links to standardized forms of undertaking documents. This access to standard forms and documents provides the user with a reliable way of understanding and testing the transactions.

The exchange may also provide on-line assistance in completing the process, as well as access to expertise and other sources of advice.

The exchange could operate to make forfaiting transactions available to local banks, reducing its cost and increasing the volume of forfaiting transactions.

An asset screening document may also be provided for use by potential buyers to select the types of asset they wish to view, and not view. In this way a potential buyer will only see assets that a seller wants to sell to buyers of their class, and which are of the selected types. This renders the initiation of transactions more efficient.

In a second aspect, the invention is a computerised forfaiting exchange, comprising:

A web site accessible via the Internet to sellers and buyers using computers.

A database associated with the web site and storing:
  a counter party selection document, where the document contains a list of classes of counter parties together with counter party selection entry facilities;
  an offer document, where the offer document contains the following items:
    a list of classes of asset together with asset selection entry facilities and asset information entry facilities for entry of details of the asset, a list of terms for the offer together with offer selection entry facilities and offer information entry facilities for entry of details of the offer,
    a list of offer documents to accompany the offer together with offer document selection entry facilities and offer document attachment facilities for attaching copies of offer documents,
    a list of undertakings for the seller to make together with undertaking selection entry facilities and undertaking document attachment facilities for attaching copies of undertaking documents;
  a counter offer document containing counter offer selection and information entry facilities.

A processor associated with the web site and the database and operable to retrieve a document from the database to view at the web site.

The processor being further operable on request either to permit the entry of selections and information to create instances of documents on-line.

The processor being further operable to permit viewing of instances of offer documents by potential buyers, depending upon the selections and entries made by the seller in counter party selection document.

Alternatively the processor being operable on request to print an offer document for use off-line.

In a third aspect, the invention is another method of operating a computerised forfaiting exchange to facilitate a forfaiting transaction, comprising the steps of:

Providing an offer document on request to a seller to view at the web site, where the offer document contains the following items:
  a list of classes of asset together with asset selection entry facilities and asset information entry facilities for entry of details of the asset,
  a link to an independent source of financial information,
  a list of terms for the offer together with offer selection entry facilities and information entry facilities for entry of details of the offer,
  a list of offer documents to accompany the offer together with offer document selection entry facilities and offer document attachment facilities for attaching copies of offer documents, links to standardized forms of offer documents,
  a list of undertakings for the seller to make together with undertaking selection entry facilities and undertaking document attachment facilities for attaching copies of undertaking documents, links to standardized forms of undertaking documents.

Permitting the seller to download the offer document.

BRIEF DESCRIPTION OF THE DRAWINGS

An example of the invention will now be described with reference to the accompanying drawings, in which.

BEST MODES OF THE INVENTION

Figure 1:
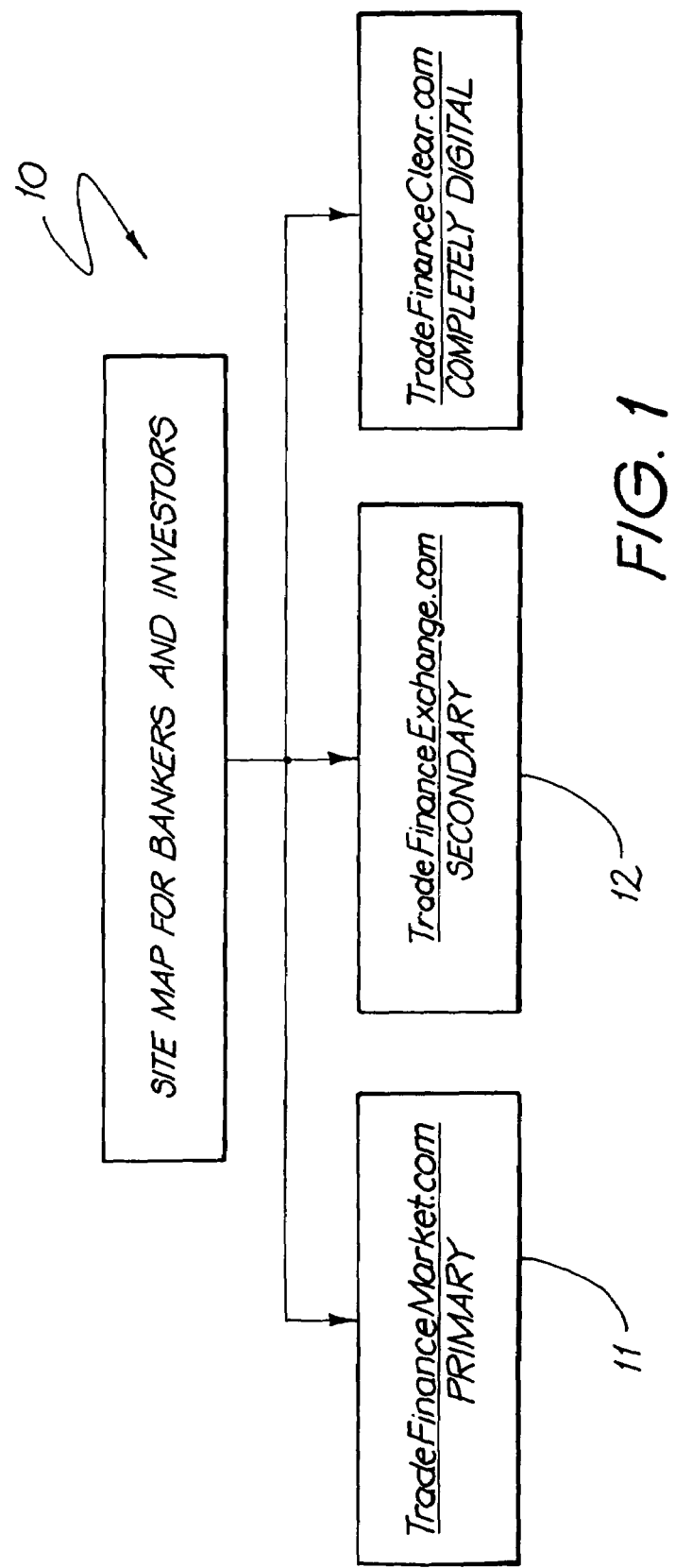
FIG. 1 is a diagram of a web site map.

Referring first to FIG. 1 the computerised forfaiting exchange comprises a web site having site map 10 illustrated in FIG. 1. This site map is accessible by both bankers and other investors, and provides gateways into a primary platform 11 and a secondary platform 12.

Figure 2:
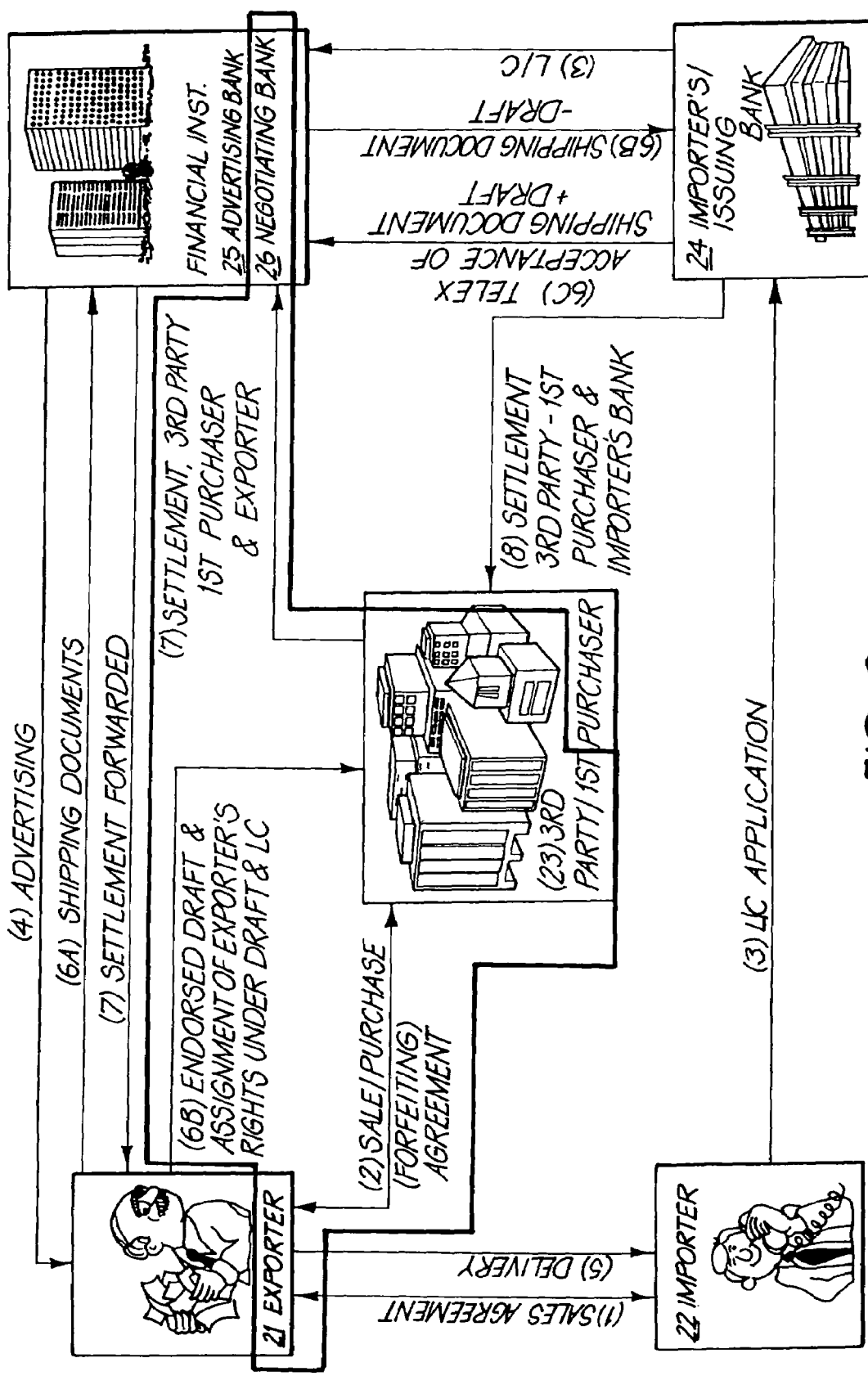
FIG. 2 is a diagram of the underlying parties and the business flows that precede a forfaiting transaction executed via the software on (or and) the website using the 'primary platform' according to the invention. The portion that is addressed on the web site is encircled for clarification sake.

The primary platform is designed to facilitate the development of transactions: the sale of receivables held by the exporter 21 to a third party purchaser 23 that is not the exporters negotiating bank 26. The transaction is between and exporter 21, a third party purchaser 23, and the negotiating bank 26; as illustrated in FIG. 2.

All of the following precedes the 'forfaiting' transaction (the sale/transfer of ownership of the receivable/payment obligation without recourse to the exporter/the beneficiary):

The exporter 21 has signed a sale/purchase agreement with the importer 22 for goods to be imported.

The importer's bank 24 opens the deferred payment letter of credit in favour of the exporter 21. The letter of credit is sent to the exporter's advising bank 25. The advising bank 25 advises the exporter that the letter of credit has been opened.

The exporter then delivers the goods to the importer and presents all the necessary shipping documents for draw down of the letter of credit to its negotiating bank 26, which in turn forwards them to the importer's bank 24 for acceptance (unless otherwise instruct under the terms of the L/C).

The (importer's) L/C issuing 'opening' bank 24 accepts the shipping documents as in compliance with the terms of the letter of credit and the negotiating bank 26 draws (sends) a draft(s)/bill(s) of exchange on (to) the importer's bank 24. In this transaction example, the exporter is the beneficiary of the draft(s). Upon the (importer's) L/C issuing bank's 24 acceptance of the draft(s) a negotiable instrument is born. This occurs in one of two alternative executions: 1) the hard copy of the draft on which the exporter is the beneficiary is accepted by the L/C 'opening' (issuing) bank and for good practice is sent back to the exporter's negotiating bank which is legally authorized by the exporter to receive it on its behalf. The payment obligation (asset) has thereby been created; 2) the L/C opening bank sends a tested telex or SWIFT message, in lieu of original draft(s)/bill(s) of exchange, to the negotiating bank stating that the L/C 'opening' (issuing) bank accepts the draft(s) (bill(s) of exchange). If In accordance with best practice this telex fully states the payment obligation undertaken in the hard copy of draft(s) or bill(s) of exchange and thereby confirms the amount(s) due on day/month/year date(s), that the bank will under no circumstances release the bill(s) of exchange to any other party, person or institution other than exporter and/or its assignee(s) and undertakes to pay upon presentation in effective currency at maturity the referenced amount(s), without any deductions whatsoever, to the exporter and/or its assignee(s). The negotiating bank 26 informs the exporter that it (the exporter) has received the bona fide claim-payment obligation. It is at this point that in this example the forfaiting transaction (the sale/transfer of ownership of the receivable/payment obligation without recourse to the exporter/the beneficiary) commences its execution via the website. Although the bank would have most likely consulted the software and platform for documentation forms and assistance in preparing the underlying documents to be authorized and or signed by the exporter prior to this point in time and in preparation for this point in time. The bank informs the exporter that it has a bona fide claim, transmitting all the details of that claim/payment obligation, asks if the exporter would like to authorize the bank to initiate a sale of the receivable (transfer of the payment obligation) on Global Trade Finance Network's primary platform and if so at what price or price range, terms and provide a forfaiting contract between the bank and the exporter online for their signature and includes all the forms and authorizations necessary for the bank to execute such a transaction on behalf of the exporter. This can be executed using the software down loaded in hard copy, or online for an offline close or a completely digital execution.

The exporter then appoints its negotiating bank 26 to negotiate the sale of the asset and the negotiating bank goes out to find a third party purchaser 23 via the website.

In this example the exporter without recourse to itself endorses the draft to a third party purchaser 23, assigns the rights under the deferred payment letter of credit and commercial invoice(s) to a third party purchaser, notifies the negotiating bank and the L/C 'opening' bank of its assignment. There is an option to complete these documents in blank (without the name of the third party purchaser) to be held in trust and under specific instructions (or not) by the exporter's negotiating bank.

The negotiating bank is now in a position to seek a third party purchaser and seeks to find a match for the terms and documents which may be negotiated or not via the website distribution/exchange system.

In the event the terms of the transaction are all agreed between the negotiating bank as agent for the exporter, the exporter and the buyer. The negotiating bank 26, acting as agent on behalf of the exporter acknowledges to the third party purchaser that they have been informed of the assignment. The third party purchaser reserves the right to request the negotiating bank to notify the importer's L/C 'opening' bank 24 of the assignment of the claim. In this case the negotiating bank does this. The importer's L/C 'opening' bank 24 then acknowledges their acceptance of the assignment and their obligation to pay irrevocably and directly to the third party purchaser 23 or according to their instructions. Generic documents acknowledging the sale/transfer of ownership and obligation(s) to pay are executed online or viewed online and executed offline and then the counter parties will have the choice to close offline or online via a digital execution of the same. The counter parties will be able to choose 1) digital or non digital escrow services, warehouse services or neither, and 2) offline hard copy close or online digital closing. In this transaction example the offline option has been chosen prior to commencing the transaction, all the hard copy original and conformed copy documents are forwarded to the buyer, an escrow agent or warehouse facility for hard copy review and acceptance.

Settlement then takes place between the exporter 21 and the third party purchaser 23 via the negotiating bank 26. Upon presentation, verification and acceptance of all the documents, the third party purchaser 23 wires the funds to the negotiating bank 26 for the account of the exporter.

Upon maturity of the deferred payment letter of credit, the third party purchaser 23 (provided it has held the receivable until maturity) receives the payment directly from the importer's bank 24 or wired via the negotiating bank depending on the agreed upon terms. Of course if the third party purchaser(s) subsequently sell(s) the asset, payment is made to the current holder/owner of the asset provided a bona fide transfer has been executed and or the L/C issuing bank accepts the transfer as such.

The primary platform 11 of the forfaiting exchange 10 facilitates this transaction by providing a number of online, interactive, multi-lingual 'smart' documents and 'smart' guided processes for completing and submitting the documents either in hard copy or digitally for a hard copy or digital close. The primary platform also aggregates and provides access to information and links, such as financial information feeds like Reuters and the latest LIBOR rates. There is also access to risk management information, local, regional and international trade finance news feeds, speciality bulletin board, ratings, Uniform Code of Practice (UCP 500), indicative rates and any software solutions tools. These live links provide up to the minute global information, guided and selective searches, and improved risk and risk management. Multilingual administrative expertise (vocal and digital) is provided on specific transactions on a 'pay per use' facility (packages of time can also be purchased in advance). Administrative expertise is provided on generic documents free of charge. Information is also provided about procedures for primary and secondary financing and underlying transaction structures. All of this multilingual expertise & support critical to the transaction process and distribution is provided twenty four hours online or via telephone. At the outset of the aforementioned transaction the bank 26 informs the exporter that they have a bona fide claim.

In this case the advising and negotiating bank is the Singapore Bank Limited and it advises its client, the exporter's Singapore Technologies Engineering Limited (STEL) by filling in the relevant details in entry boxes of the document that follows:

"The Singapore Bank Ltd"

LOGO of Negotiating Bank

---

"The Singapore Bank Ltd", the Negotiating Bank hereby notifies Singapore Technologies Engineering Limited (STEL) THAT STEL has a valid claim for USD 17,800,000.00 on Banque Misr, Head, Cairo, Egypt payable in the following amounts on the following dates:

*DRAFT NO. 1:
AMOUNT: USD 2,966,666.67   Latest News
MATURITY DATE: 18/10/2001   Credit Information
TENOR: 181 + Days   Enhancement Tools DRAFT NO. 2:
AMOUNT: USD 2,966,666.67
MATURITY DATE: 18/04/2002
TENOR: 363 + Days DRAFT NO. 3:
AMOUNT: USD 2,966,666.66
MATURITY DATE: 18/10/2002
TENOR: 546 + Days DRAFT NO. 4:
AMOUNT: USD 2,966,666.67
MATURITY DATE: 18/04/2003
TENOR: 728 + Days DRAFT NO. 5:
AMOUNT: USD 2,966,666.67
MATURITY DATE: 18/10/2003
TENOR: 911 + Days DRAFT NO. 6:
AMOUNT: USD 2,966,666.66
MATURITY DATE: 18/04/2004
TENOR: 1094 + Days

---

The completed instance of this document is then transmitted to STEL for its records, together with the following document which STEL is invited to complete to authorize the Singapore Bank Ltd. to seek a third party purchaser on its behalf and to commence the sale of the receivable without recourse to the exporter (a forfaiting transaction).

STEL is invited to indicate, by clicking the radio button below the first paragraph, whether it wishes to initiate the transaction, and if so, to complete the remainder of the documents:

STEL completes the following document to instruct and authorize the bank to seek a buyer under the terms specified (In actuality much of this information has already been completed by the bank that has it on record and the exporter is thereby then in that case the authorized party re-stating it), and contracts with the bank for these services.

WOULD

[STEL]

LIKE TO INITIATE A TRANSACTION via "The Singapore Bank Ltd"'s PRIMARY PLATFORM Services provided by Global Trade Finance Network™ Ltd to obtain from the global market place offers at the best price, terms and conditions for financing without recourse to the Exporter?

○ Yes ○ No

---

Please complete the following:

(All L/C and corporate details known to "The Singapore Bank Ltd" have been completed by "The Singapore Bank Ltd" for [STEL]'s convenience.)

Exporter Submission Page

Exporter Name [Singapore Technologies Engineering Limited (STEL)]
Region [South East Asia]
Credit Rating (if any) [Moody's Aa1]
Credit reports published by
Dun and Bradstreet
Capital [USD 501 MM]
Assets [USD 2470 MM]

NEGOTIATING BANK DETAILS (Pre-formatted Negotiating Bank)
This section is also preformatted by the Negotiating Bank
("The Singapore Bank Ltd")

Negotiating Bank Name ["The Singapore Bank Ltd", Singapore]
Head Office [X]
Branch [..................]
Subsidiary [..................]
City, Country [Singapore, Singapore]
Region [South East Asia]

---

[Singapore Technologie]

's (EXPORTER's) INSTRUCTIONS & Authorization FORM:

[All fields that pertain to information the Negotiating Bank has on its files, have been completed for the convenience of

[STEL]

the Exporter]

We, Singapore Technologies Engineering Limited (STEL), request without recourse financing for the following transaction via "The Singapore Bank Ltd"'s Primary Platform Services on Global Trade Finance Network™ Ltd [

[STEL]

has the capability to edit this information, should

[STEL]

whish to do so.]

Form of ASSET on offer:*
  ⊙ Draft(s)/Bill(s) of Exchange drawn under Deferred payment (usance) letter of credit(s)
  ○ Site letter of credit requiring confirmation
  ○ Down payment on ECA (Export Credit Agency) transaction, structured for deferred payment plus:
  Draft
  Promissory note
  Credit enhancement
  Letter of credit
  Aval
  ○ Naked deferred payment claim:
  Draft
  Promissory note
  ○ Deferred payment claim with credit enhancement
  ○ Deferred payment claim with financial guarantee:
  Avalized Draft
  Avalized Promissory note
  Draft with bank guarantee
  Promissory note with guarantee OFFER Description has been completed by the bank for the convenience of the Exporter, and appears on the Exporter's screen at the time the bank notifies the Exporter that the Exporter has a valid claim for proceeds under these documents.: *

---

*L/C ISSUING BANK: [Banque Misr]         Latest News
*BRANCH: [Head office]                    Credit Information
*L/C AMOUNT: [17,800,000.00]              Enhancement Tools
*CURRENCY [US Dollar ▼]
*UNDERLYING TRANSACTION
(GOODS) [machinery testing equipment]
*MAXIMUM TENOR [1095] days
       AFTER BILL OF LADING ⊙
*DAYS remaining [1094] + days
*AVERAGE LIFE [546] + days
*Total NO of DRAFT(S)/BILL(S) OF
EXCHANGE [6]
*REPAYMENT ⊙ SEMIANNUAL
            [..................]
            ○ ANNUAL
            [..................]

Advising Bank ["The Singapore Bank Ltd"]
Negotiating Bank ["The Singapore Bank Ltd"]
Domicile of Calendar used
in days calculation [Egypt]
Payment Domicile [Banque Misr, Head Office, Cairo, Egypt]
*Designation of
Shipment [Alexandria, Egypt]
Shipment of Origination
(geographic) [Singapore]

-continued

TERMS OF OFFER
*obligatory field
*Type of calculation:  (select calculator)
    ○ BOND
    ⊙ Trade Finance discount methods:
        ○ DISCOUNT-TO-YIELD (DTY)
            ○ Compounded annually
            ⊙ Compounded semi-annually
        ○ STRAIGHT DISCOUNT (SD)
Interest rate to be
discounted (Price):  (Select one)
    ⊙ * Guideline
    (or)
    ○ *Offered
    (NOTE: THIS MEANS THE Seller IS FIRMLY
    REQUESTING NOT SUGGESTING A
    GUIDELINE)
Interest Guideline/offered: (Select one)

⊙ Libor + [1.9375]  % p.a.
        ○ Libor + [........]  % FLAT

LIBOR Options*:  (Select one)
    ⊙ Matching AVERAGE LIFE
    ○ Matching the tenor of EACH DRAFT
    Libor fixing 2 days before disbursement
INTEREST BASIS:  ○ 365 days over 360 days DAYS OF GRACE:  [4] days We hereby authorise "The Singapore Bank Ltd" to act on behalf of

[Singapore Technologies Engineering Limited (STEL)]

to obtain a Third Party Purchaser at best offered price, terms and conditions for the aforementioned trade debt receivable from "The Singapore Bank Ltd"'s Primary Platform Services via Global Trade Finance Network™ Ltd (GTFNet) and, as

[Singapore Technologies Engineering Limited (STEL)]

's agent and the Negotiating Bank to provide & deliver the following information, documentation and Sale Purchase Contract to the counterparty(s) accepted by

[STEL]

as the Third Party Primary Purchaser(s):
I. As the Negotiating Bank, on behalf of STEL to notify potential Third Party Purchasers on GTFNet that negotiation of the documents has been completed and STEL (the Exporter) is ready to endorse the Bill(s) of Exchange and assign the rights under the L/C.
II. We authorise "The Singapore Bank Ltd" to disclose to potential Third Party Purchasers on GTFNet the following specific information on the importer:

Capital:    [....................]
Turnover:    [USD 273 MM (1999)]
Credit Rating:    [....................]

Optional: complete those fields which are to be disclosed)
III.

[STEL]

has herewith signed the Standard Sale/Purchase Contract, [with the form and content download from GTFNet's website,] and delivers it to "The Singapore Bank Ltd" to hold in trust custody. The name of the counterparty has been left blank and will be inserted by "The Singapore Bank Ltd" under standing irrevocable instructions from

[STEL]

to be triggered by

[STEL]

's acceptance of a counterparty's offer and to be delivered by "The Singapore Bank Ltd" to the Third Party Purchaser and as scanned verified true copies to GTFNet. The Exporter hereby has already delivered or agrees to sign and present all documents required as per the Sale/Purchase Contract within its power to present and/or confirms that it hereby authorises "The Singapore Bank Ltd" to request, obtain and deliver all required documents from the L/C Issuing bank, as follows:
1. Certified True (Conformed) Copy of L/C issued together with all amendments
2. Certified True (Conformed) Copy of a tested telex/SWIFT message from the L/C Issuing Bank to the Negotiating Bank confirming that the documents are in full compliance with the L/C terms and that [USD 2,966,666.67] is due on [18/10/2001],
that [USD 2,966,666.67] is due on [18/04/2002],
that [USD 2,966,666.66] is due on [18/10/2002],
that [USD 2,966,666.67] is due on [18/04/2003],
that [USD 2,966,666.67] is due on [18/10/2003],
that [USD 2,966,666.66] is due on [18/04/2004].

3. Confirmation from you, the Negotiating Bank that the documents fully comply with the L/C terms and that USD 2,966,666.67 is due on 18/10/2001,
that USD 2,966,666.67 is due on 18/04/2002,
that USD 2,966,666.66 is due on 18/10/2002,
that USD 2,966,666.67 is due on 18/04/2003,
that USD 2,966,666.67 is due on 18/10/2003,
that USD 2,966,666.66 is due on 18/04/2004.

4a. Certified True (Conformed) Copy(s) of Bill(s) of Lading evidencing shipment
5a. Certified True (Conformed) Copy of Commercial Invoice(s)
5b. Certified True (Conformed) Copy of the Letter of Assignment of proceeds under the LC to the Purchaser signed by the Exporter and addressed to Negotiating Bank in the form and content downloaded from GTFNet's Website.
"GTFNet Standard Document"
5c. Certified True (Conformed) Copy of the Letter of Assignment of proceeds under the commercial invoice to the Purchaser signed by the Exporter addressed to the Negotiating Bank in the form and content downloaded from GTFNet's Website.
"GTFNet Standard Document"
6. Draft(s)/Bill(s) of Exchange endorsed without recourse by the Exporter to the order of the Purchaser, in the form and content downloaded from GTFNet's Website.
"GTFNet Standard Document"

In the event the L/C Issuing Bank is absolutely not willing to return the draft, then alternatively,
7. Certified True (Conformed) Copy of the Telex Acceptance of the Draft(s)/Bill(s) of Exchange by the L/C Issuing Bank in the case of a telex acceptance in lieu of original Draft(s)/Bill(s) of Exchange.
"GTFNet Standard Document"
8. Verification from the Negotiating Bank that Exporter's signature(s) appearing on documentation is/are authentic and the signatory(s) is/are authorised to sign (singly/jointly) on behalf of the Exporter, in the form and content downloaded from GTFNet's Website.
"GTFNet Standard Document"
9. Certified True (Conformed) Copy of the letter of notification from Exporter to Issuing Bank in which the Exporter notifies the LIC Issuing Bank of the assignment of the proceeds to the Purchaser, with the content downloaded from GTFNet's Website.
"GTFNet Standard Document"
10. Certified True (Conformed) Copy of tested telex/SWIFT message from Issuing Bank acknowledging assignment of proceeds in favour of Purchaser and agreement to pay the Purchaser with no deductions.
"GTFNet Standard Document"
11. In the event that the L/C Issuing Bank should refuse to change the payment route established under the L/C, the Negotiating Bank will issue an irrevocable payment instruction to its correspondent in the country of the currency in which the draft and L/C are denominated. With an irrevocable payment instruction that indicates that upon receipt of the funds, the Correspondent Bank must wire the funds directly to the Purchaser and not credit the Negotiating Bank's account.
"GTFNet Standard Document"
12.

STEL authorises the Negotiating Bank to use custodian services, if requested by the Purchaser.

We understand that "The Singapore Bank Ltd"'s system interface will present the terms of all offer(s) received to

STEL for

STEL

's consideration and final acceptance. STEL will respond with the acceptance or rejection in a timely manner, which acceptance will then be delivered to the agreed upon counterparty by "The Singapore Bank Ltd"'s system interface via Global Trade Finance Network™ Ltd. We understand and acknowledge that

STEL remains with full recourse on this receivable until the without recourse purchase sale has been completed and payment received in the account of

STEL at "The Singapore Bank Ltd".
Agreed and Accepted

Singapore Technologies Engineering Limited (STEL)

(Digital Signature—proposed technology-Identrus, Entrust, Verisign depending on relevant jurisdiction e.g. Entrust for Singapore)

BY ............................
BY ............................

"The Singapore Bank Ltd"

............................

(Digital Signature—proposed technology-Identrus, Entrust, Verisign depending on relevant jurisdiction e.g. Entrust for Singapore)

BY .........................

BY .........................

Note: The negotiating bank retains the choice to pass on to the exporter all offers, or specified offers received on behalf of the exporter, or to load the offer margins or add fees. These are all product features specifically customized for and as indicated by the negotiating bank and in accordance with their relationship management with their customers.

When STEL is satisfied with the submission they are able to submit it by clicking the "submit" button. They could also choose to submit all the documents by fax or in hard copy. This completes the offer indicated at 31 on FIG. 3.

The Singapore Bank Ltd 25/26 will be registered on the primary trading platform in order to access its services, and will have an identifier and password to enable them to access the platform. Each transaction they enter will have a random alphanumeric code assigned to it. The bank receives the offer, adjusts the offer, or not as the customer relationship management may dictate and/or each case may be and submits it to the primary trading platform 32.

Here the offer will specify the following matters:

The classes of buyers to whom they are prepared to sell, and the classes of buyers to whom they are not prepared to sell.

The class of asset together with full details of the asset.

The terms for the offer, which have been set by the exporter, unless the exporter authorizes the bank to do so on its behalf.

Documents which will accompany the offer. These documents are standard and generic provided by the exchange network and sanitized as necessary by the negotiating bank upon submission to the primary platform, for instance to remove the exporter's identity. The exchange is dynamic in this respect. The bank can also consult experts (vocal or digital or both) provided by the exchange/network for advice on administrative, preparation and submission matters. And, Undertakings the bank may be prepared to make in support of the offer. Undertakings the exporter is prepared to make to support the offer, but the bank may customize the undertakings by the exporter with the agreement of the exporter, the bank may request signature(s) on documents that leave the purchaser's name in blank before offering the receivable for sale on the primary platform. Note—the bank is not required to produce the exporters permission or agreement for the bank to load margins or add fees, etc. that is left to the bank and its relationship with its exporter.

Figure 3:
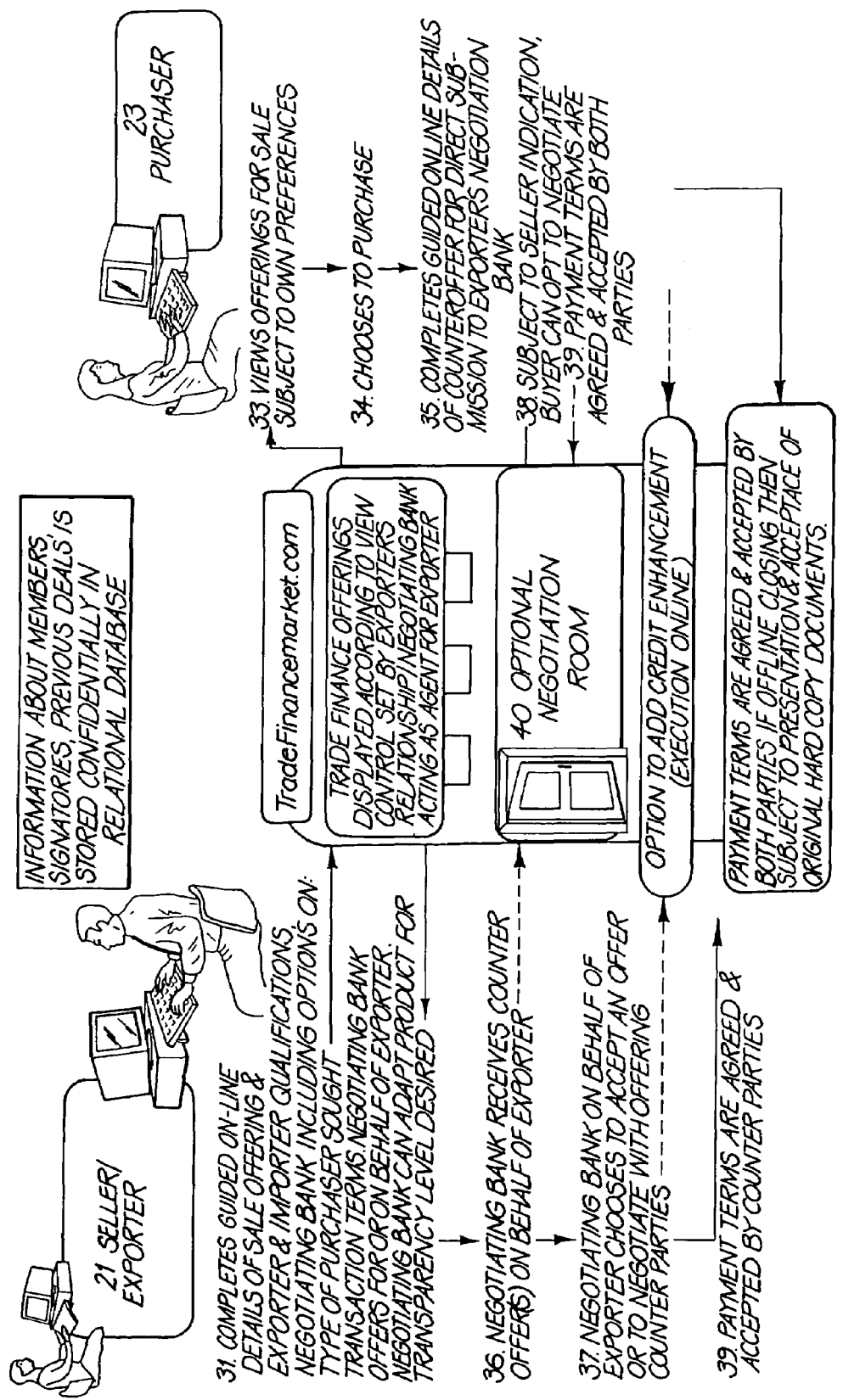
FIG. 3 is a flow chart of the business flows on the primary platform.

At this point, the negotiating bank acting as agent for the exporter offers the transaction on the platform to potential buyers; this is indicated at 32 on FIG. 3. A potential buyer may view the offering(s) for sale, only viewing qualified assets according to the indications that they have preselected; as shown at 33 on FIG. 3. Should they choose to purchase 34, they are then presented with a guided submission to complete and return 35.

The negotiating bank will be able to view any counter offers subsequently received, 36 and if the negotiating bank so chooses, may make them visible to the exporter, before and/or after loading pricing and adding fees. The negotiating bank controls the Customer Relationship Management (CRM) features. In the View counter offers summary window example shown below there are four counter offers received.

In the first counter offer #1, the buyer known as "juyh8", has indicated that they wish to negotiate price and terms, but not terms and conditions. They wish particularly to buy draft No 1 for a particular price. In offer #2 the buyer wishes to buy two of the drafts. In offer #3 the buyer desires a different discount equation, straight discount in alternative to discount to yield. All industry words are explained upon a "click". In offer #4 the buyer wishes to buy four of the drafts.

View Counteroffers—Summary

Primary: SELL: Bank Customer Windows: View Counteroffers—Summary

Disclaimer: The names and identities of counterparties and transactions utilized in the sample transaction are in no way similar to or representative of actual transactions or counterparties and are for demonstration purposes only.

---

View Counteroffers for Exporter #1, "STEL", Seller Handle "ttre54"

L/C ISSUING BANK: Banque Misr, Head, Cairo, Egypt   Latest News
L/C AMOUNT: USD 17,800,000.00   Credit Information
MAXIMUM TENOR: 1095 days   Enhancement Tools
 AFTER BILL OF LADING ⊙
Payment Domicile: Banque Misr, Head, Cairo, Egypt
Total NO. OF DRAFT(S)/BILL(S)
OF EXCHANGE   6
REPAYMENT   ⊙ SEMIANNUAL OFFER #1
Response FROM Buyer Handle: "juyh8"
TO Seller Handle: "ttre54"
Do you wish to negotiate price/terms         ⊙ yes
                                              ○ no
Do you wish to negotiate document terms & conditions   ○ yes
                                              ⊙ no
"Found Match, Let's Negotiate"
Buyer's choices
We request the following changes to the terms:   Calculator 1. Buyer willing to purchase 1 drafts out of 6

Drafts
*DRAFT NO 1:
AMOUNT: 2,966,666.67
MATURITY DATE: 18 Oct. 2001
TENOR: 181 Days +
2. Interest Rate for Draft No. 1

Matching Libor + 1.675 pct. p.a.         ○ yes

Proceeds USD 2,875,582.59         ○ no

<View Terms>
<View Complete Counteroffer>
<View Seller's Documents>

OFFER #2
Response FROM Buyer Handle: "bemm09"
TO Seller Handle: "ttre54"
Do you wish to negotiate price/terms         ⊙ yes
                                              ○ no
Do you wish to negotiate document terms & conditions   ○ yes
                                              ⊙ no
"Found Match, Let's Negotiate"
Buyer's choices
We request the following changes to the terms:   Calculator 1. Buyer willing to purchase 2 drafts out of 6

2. Matching Libor for Each Draft + Margins as follows
Draft No. 1

-continued

View Counteroffers for Exporter #1, "STEL", Seller Handle "ttre54"

L/C ISSUING BANK: Banque Misr, Head, Cairo, Egypt   Latest News
L/C AMOUNT: USD 17,800,000.00   Credit Information
MAXIMUM TENOR: 1095 days   Enhancement Tools
  AFTER BILL OF LADING ⊙
Payment Domicile: Banque Misr, Head, Cairo, Egypt
Total NO. OF DRAFT(S)/BILL(S)
OF EXCHANGE   6
REPAYMENT   ⊙ SEMIANNUAL Libor + 1.75 pct. p.a.   ○ yes
  ○ no
Draft No. 2

Libor + 1.875 pct. p.a.   ○ yes
  ○ no
Compounding Semiannually
Total face amount of purchase 5,933,333.34
*DRAFT NO.1:
AMOUNT: 2,966,666.67
MATURITY DATE: 18 Oct. 2001
TENOR: 181 Days +
DRAFT NO.2:
AMOUNT: 2,966,666.67
MATURITY DATE: 18 Apr. 2002
TENOR: 363 Days +
Proceeds USD 5,641,397.68

<View Terms>
<View Complete Counteroffer>
<View Seller's Documents>
OFFER #3
Response FROM Buyer Handle: "dogi4"
TO Seller Handle: "ttre54"
Do you wish to negotiate price/terms   ○ yes
  ○ no
Do you wish to negotiate document terms & conditions   ○ yes
  ○ no
"Found Match, Let's Negotiate"   Calculator
Buyer's choices
We request the following changes to the terms:
*Type of calculation:
STRAIGHT DISCOUNT (SD)
Interest rate to be discounted (Price): (select one)

Interest offered: Libor + 1.9375 % p.a.
  *LIBOR Options:

(Select one)
Matching AVERAGE LIFE ⊙
INTEREST BASIS - 365 DAYS OVER 360 DAYS

Proceeds USD 15,981,371.53

<View Terms>
<View Complete Counteroffer>
<View Seller's Documents>
OFFER #4
Response FROM Buyer Handle: "dogi4"
TO Seller Handle: "ttre54"
Do you wish to negotiate price/terms   ⊙ yes
  ○ no
Do you wish to negotiate document terms & conditions   ○ yes
  ⊙ no
"Found Match, Let's Negotiate"
Buyer's choices
We request the following changes to the terms:   Calculator -continued View Counteroffers for Exporter #1, "STEL", Seller Handle "ttre54"

L/C ISSUING BANK: Banque Misr, Head, Cairo, Egypt   Latest News
L/C AMOUNT: USD 17,800,000.00   Credit Information
MAXIMUM TENOR: 1095 days   Enhancement Tools
  AFTER BILL OF LADING ⊙
Payment Domicile: Banque Misr, Head, Cairo, Egypt
Total NO. OF DRAFT(S)/BILL(S)
OF EXCHANGE   6
REPAYMENT   ⊙ SEMIANNUAL 1. Buyer willing to purchase 4 drafts out of 6

DRAFT NO.3:
AMOUNT: 2,966,666.66
MATURITY DATE: 18 Oct. 2002
TENOR: 546 Days +
DRAFT NO.4:
AMOUNT: 2,966,666.67
MATURITY DATE: 18 Apr. 2003
TENOR: 728 Days +
DRAFT NO.5:
AMOUNT: 2,966,666.67
MATURITY DATE: 18 Oct. 2003
TENOR: 911 Days +
DRAFT NO.6:
AMOUNT: 2,966,666.66
MATURITY DATE: 18 Apr. 2004
TENOR: 1094 Days +
2. DISCOUNT-TO-YIELD (1) (DPI) ⊙
3. Interest rate to be discounted (Price): (select one)

Interest offered: Libor + 2.1275 % p.a.
*LIBOR Options: (Select one)
Matching AVERAGE LIFE ⊙
Average Life: 728 days +
INTEREST BASIS - 365 DAYS OVER 360 DAYS
Proceeds USD 10,153,339.51

<View Terms>
<View Complete Counteroffer>
<View Seller's Documents>
Documentation under legal counsel review
+Apr. 20, 2001 was utilized as the calculation date in this transaction Depending on the terms of the CRM offered and agreed between the negotiating bank and its customer, the negotiating bank, or the exporter, may choose to accept a counteroffer, or to continue negotiation on any or all of the offers by returning further counteroffer documents, 37. The buyers can also choose to negotiate by returning counter offer documents, 38. When full agreement is reached, payment terms are agreed and accepted by both parties, 39.

Alternatively, if full agreement is not reached in through this match negotiate format and process the parties may enter the negotiating room 40 in order to negotiate. This might happen for instance, where there is a subject requiring negotiation that does not fit the structure described above. The negotiation continues to use the alphanumeric identifiers to maintain anonymity.

It should be appreciated that both the exporter 21 and the buyer 23 take part in the process anonymously until sufficient or all terms have been agreed for them to settle the negotiation. It should also be appreciated that the information they provide to each other is controlled by the offering institution excluding obligatory fields. Guidance is given and documents proposed via the online documents. At many places during the negotiations the forms provide links to obtain latest news and credit information as well as credit enhancement and software support tools that assist in developing the transaction.

The secondary trading platform 12 is provided for a slightly different transaction, that is the sale by the first (primary) purchaser of the exporter's receivable to a second purchaser 27. Subsequent sales require minor variation of the following. Nevertheless it enable the primary purchaser to revisit, amend and or enhance its underlying documentation with the exporter in order to utilize best practice documentation and procedures. Alternatively standard documentation and procedure can be engaged from the outset by the bank to execute the purchase form the exporter.

All of the following precede this second (secondary) 'forfaiting' transaction (the sale/transfer of ownership of the receivable/payment obligation without recourse to the exporter/the beneficiary and subsequent holders (owners).

The exporter 21 has signed a sale/purchase agreement with the importer 22 for goods to be imported. The importer's L/C 'opening' bank 24 opens the deferred payment letter of credit in favour of the exporter 21. The letter of credit is sent to the exporter's advising bank 25. The advising bank 25 advises the exporter that the letter of credit has been opened. The exporter then delivers the goods to the importer and presents all the necessary shipping documents for draw down of the letter of credit to its negotiating bank 26, which in turn forwards them to the importer's L/C 'opening' bank for acceptance.

The (importer's) L/C issuing 'opening' bank 24 accepts the shipping documents as in compliance with the terms of the letter of credit and the negotiating bank 26 forwards on behalf of the exporter the draft(s)/bill(s) of exchange that the exporter has drawn to the importer's bank 24. In this transaction example, the exporter is the beneficiary of the draft(s). Upon the (importer's) L/C issuing bank's 24 acceptance of the draft(s) a negotiable instrument is born. This occurs in one of two alternative executions: 1) the hard copy of the draft on which the exporter is the beneficiary is accepted by the L/C 'opening' (issuing) bank is sent back to the exporter's negotiating bank which is legally authorized by the exporter to receive it on its behalf, the payment obligation (asset) has thereby been created; 2) the L/C 'opening' bank sends a tested telex or SWIFT message, in lieu of original draft(s)/bill(s) of exchange, to the negotiating bank stating that the L/C 'opening' (issuing) bank has accepted the draft(s) (bill(s) of exchange). In accordance with best practice this draft(s) or bill(s) of exchange fully states the payment obligation undertaken by the hard copy draft and thereby confirms the amount(s) due on day/month/year date(s), that the bank will under no circumstances release the bill(s) of exchange to any other party, person or institution other than exporter and/or its assignee(s) and undertakes to pay upon presentation in effective currency at maturity the referenced amount(s), without any deductions whatsoever, to the exporter and/or its assignee(s).

The negotiating bank 26 informs the exporter that it, the exporter, has received the bona fide claim-payment obligation.

In this example the forfaiting transaction (the sale/transfer of ownership of the receivable/payment obligation without recourse to the exporter/the beneficiary) is executed between the exporter and its negotiating bank which is also the first (primary) purchaser. This may be executed with the website or not. The negotiating bank also first purchaser (primary purchaser) informs the exporter that it has a bona fide claim.

Since the beneficiary of the letter of credit is the exporter, the ownership of the payment obligation must be transferred properly to the first (primary) purchaser that in this example is also the negotiating bank, and this transfer usually includes the execution of an acceptance of the assignment of the underlying obligation by the L/C issuing 'opening' bank or other form(s) of obligation (usually the initial guarantor), the exporter and the new purchaser/holder/owner. And an acknowledgment of the assignment of the underlying obligation to the new purchaser/holder/owner by the L/C 'opening' bank and negotiating banks.

In this example transaction, the exporter has already agreed to sell this payment obligation to its negotiating bank which becomes the first purchaser (aka primary purchaser). The draft has been endorsed 'without recourse' to the exporter and the exporter assigns its rights under the letter of credit to the first purchaser (in this example the first purchaser, advising and negotiating bank are the same). Upon the completion of all the required assignments, acknowledgments, and draft(s) endorsement(s). The first purchaser (formerly the negotiating bank) pays the exporter the discounted proceeds.

The negotiating bank, now the first purchaser has thereby purchased the payment obligation and takes assignment of the rights under the letter of credit and commercial invoice. The bank may hold the asset or decide to sell it onward immediately. In any case, in this transaction example which commences at this point between the first purchase and second sale transactions, the first purchaser, formerly the negotiating bank seeks a second purchaser or secondary purchaser. The information requested on the transaction is managed in three -sections: 1) Documentation on the underlying export import transaction, 2) Documentation obtained by the first purchaser on the transfer of ownership from the exporter to the first purchaser, 3) Documentation the second seller is able and/or willing to provide to the second purchaser. When a secondary purchaser is found and the terms confirmed, the first purchaser 'without recourse' to itself endorses the draft to the second purchaser. The first purchaser assigns all the rights it has obtained from the exporter's assignment under the letter of credit to the second purchaser 27 and obtains and issues all the required acknowledgments.

The second purchaser 27 wires funds to the first purchaser 26 (formerly the negotiating bank).

Upon maturity of the deferred payment letter of credit, provided the second purchaser holds the asset until such time, the second purchaser presents the draft to the L/C issuing (opening) bank 24 for payment and receives payment directly from the L/C 'opening' bank unless payment has been routed otherwise as per items 15(*a*)(b) and (c) below.

The platform software guides the first (primary) purchaser (formerly the negotiating bank) through the proper orderly preparation of conformed copies of the documents representing the underlying trade transaction, the transfer of ownership from the exporter to the first purchaser using good practice process and procedures, and the onward sale of the asset to a second purchaser, and provides guidance and process for all the endorsement(s) and assignment(s) made by the exporter to the first purchaser and acknowledgment(s) by and other documents from the negotiating bank and others (as the case may call for). The platform (software) provides the same for the sale from the first purchaser to the second purchaser.

On the secondary platform the seller must be a holder/owner of the asset and not the original beneficiary (the exporter) which is why it is called the secondary platform. The first purchaser/holder (and second seller) is usually but not necessarily a commercial bank such as the exporter's negotiating bank, or a third party bank, forfaiting company or finance company.

A sale(s)/purchase(s) 'matched' on the secondary platform can be executed with (sold to) banks, non-bank financial institutions, non-financial institutions and packagers.

On the secondary platform the selling institution will select counter parties by filling in the following form. The buyer fills in a corresponding form to select the sellers from whom it is willing to buy (and/or those from whom it is not willing to buy). This is optionally executed at two levels first for overall, policy level broad criteria and second for the specific asset(s) to be sold.

Counterparty Selection General

Secondary: SELL: Counterparty Selection General: Seller's Worksheet

Disclaimer: The names and identities of counterparties and transactions utilized in the sample transaction are in no way similar to or representative of actual transactions or counterparties and are for demonstration purposes

---

CHOICES MENU of Broad Criteria
Select Buyers that will view offers. Select Buyers that will be excluded from viewing offer.

| Do not Send to | Send to | |
|---|---|---|
| ○ | ○ | 1. All Seller's correspondents |
| ○ | ○ | 2. All Seller's branches/subsidiaries/affiliates |
| ○ | ○ | 3. All banks located in Country |
| | | List of Countries |
| | | All countries / Afghanistan / Albania / Algeria / American Samoa / Andorra / Anguilla / Antarctica / Antigua and Barbuda ▲▼ |
| ○ | ○ | 4. All banks with branches and/or subsidiaries located in Country |
| | | List of Countries |
| | | All countries / Afghanistan / Albania / Algeria / American Samoa / Andorra / Anguilla / Antarctica / Antigua and Barbuda ▲▼ |
| ○ | ○ | 5. All banks located in Region |
| | | List of Regions |
| | | All regions / North Asia / South Asia / South-east Asia / Asia Pacific / Eastern Europe / Western Europe / Middle East / Central Asia / North Africa ▲▼ |

-continued

| Do not Send to | Send to | |
|---|---|---|
| ○ | ○ | 6. All Non Banking Financial Institutions (NBFIs) located in Country |
| | | List of Countries |
| | | All countries / Afghanistan / Albania / Algeria / American Samoa / Andorra / Anguilla / Antarctica / Antigua and Barbuda ▲▼ |
| ○ | ○ | 7. All NBFIs located in Region |
| | | List of Regions |
| | | All regions / North Asia / South Asia / South-east Asia / Asia Pacific / Eastern Europe / Western Europe / Middle East / Central Asia / North Africa ▲▼ |
| ○ | ○ | 8. All Non Financial Institutions (Non-FIs) located in Country |
| | | List of Countries |
| | | All countries / Afghanistan / Albania / Algeria / American Samoa / Andorra / Anguilla / Antarctica / Antigua and Barbuda ▲▼ |
| ○ | ○ | 9. All Non-FIs located in Region |
| | | List of Regions |
| | | All regions / North Asia / South Asia / South-east Asia / Asia Pacific / Eastern Europe / Western Europe / Middle East / Central Asia / North Africa ▲▼ |
| ○ | ○ | 10. All FIs, NBFIs and non-FIs rated by Moody's or S&P |
| | | -Rating- ▼ |
| ○ | ○ | 11. All banks on which reports have been published by Fitch ICHA ○ Yes ○ No |
| | ○ | 12. Special exceptions that override all previous choices of Seller's asset criteria and broad criteria for country selection. (These will be specific institutions targeted by the Seller) |
| ○ | | 13. Special exceptions that override all previous choices of Seller's broad criteria for counterparty selection. (These will be institutions specifically excluded by the Seller) |

-continued

[Previous] [Reset] [Submit Query]

Figure 5:
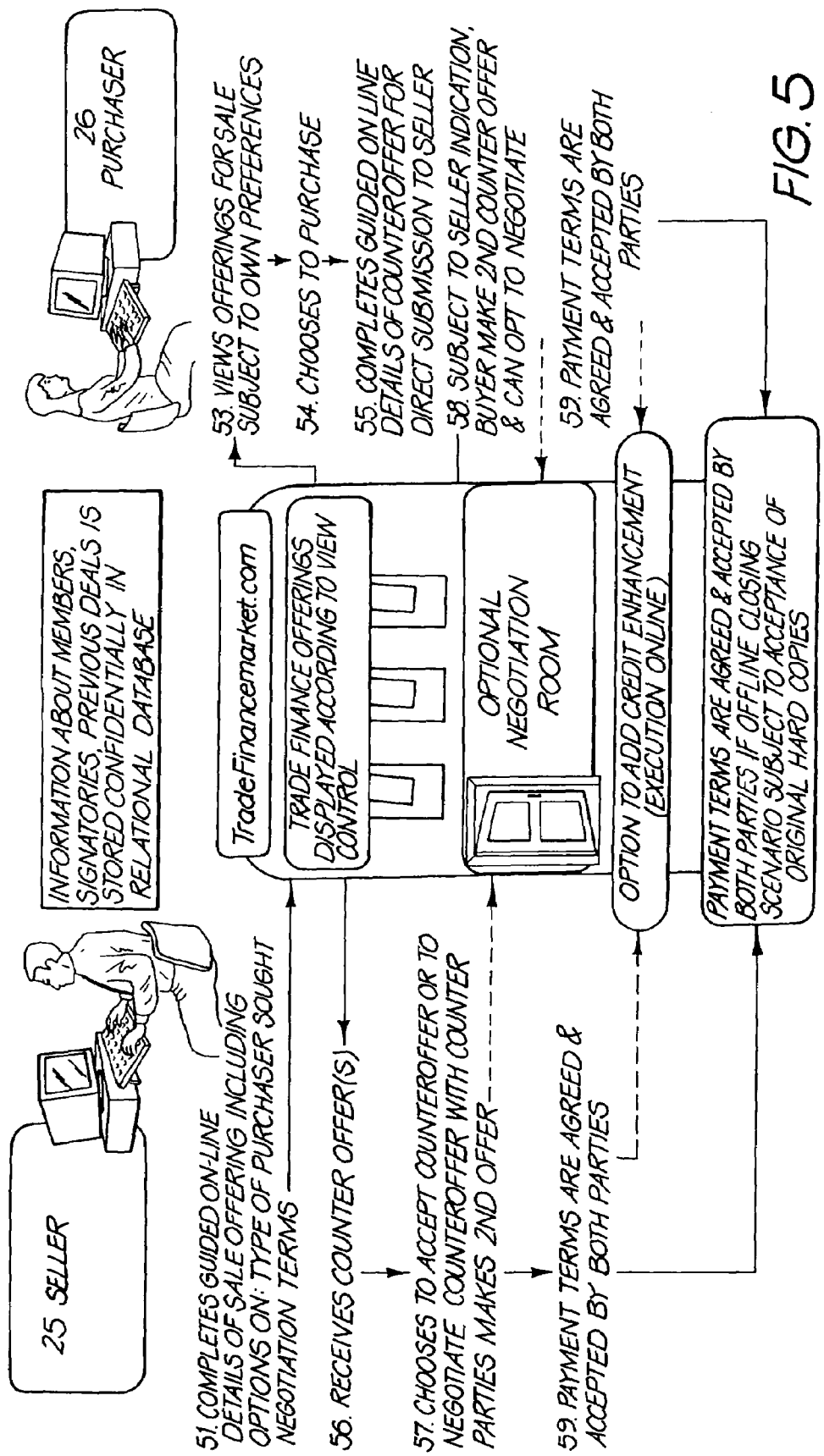
FIG. 5 is a flow chart of the business flows on the secondary platform.
Figure 2:
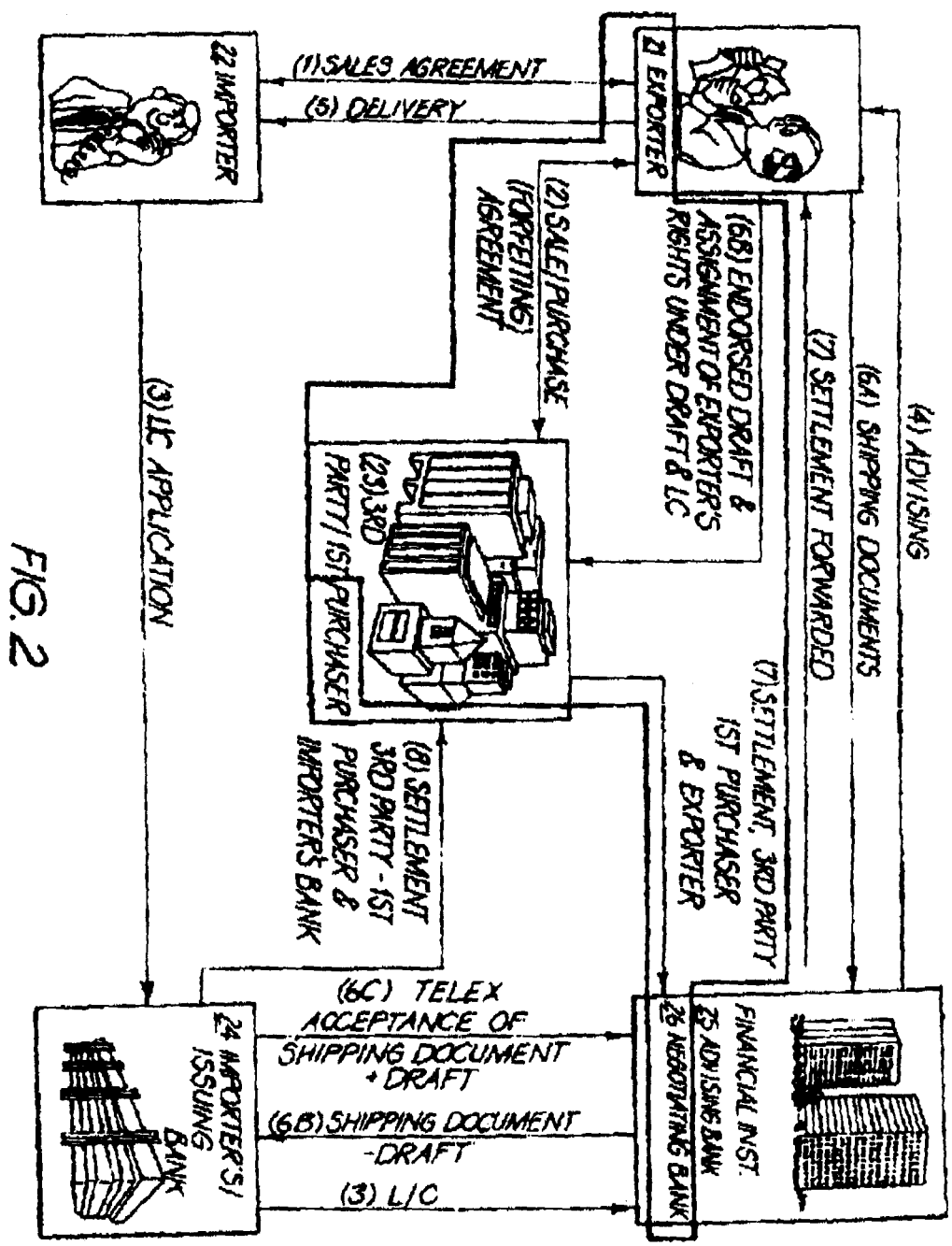

The anonymous seller then completes an 'Asset Offer Guided Submission', as indicated at 51 on FIG. 5. This involves providing details about themselves, details about the broad criteria for the transaction, the asset, the terms of the offer, the documentation and the undertakings to be made. All of this information is available only to platform members for security and avoidance of fraud, some fields are optional, some obligatory come confidential only for the platform's databank for security and avoidance of fraud.

Asset Offer Guided Submission

Secondary: SELL: Asset Offer Guided Submission: Counterparty Selection This Asset Disclaimer: The names and identities of counterparties and transactions utilized in the sample transaction are in no way similar to or representative of actual transactions or counterparties and are for demonstration purposes Seller's Worksheet Seller's present information as per subscription details appears here.

| | | |
|---|---|---|
| Seller Category: | BANK (B) | Latest News |
| Head Office | | Credit Information |
| Branch: | x | Enhancement Tools |
| Subsidiary | | |
| Representative Office | | |
| Seller Name | "Middle Eastern Regional BankLtd, Hong Kong" | |
| City, Country | Hong Kong, SAR | |
| Region | North Asia | |
| Credit Rating (if any) | Fitch IBCA -- Rating: A | |
| Credit reports published by Fitch IBCA | Yes | |
| Capital | USD 200 MM | |
| Assets | USD 2.7 Bn | |

Seller Instructions
Reminder - Broad criteria have been set
⊙ yes ○ no
CHOICES MENU of Broad Criteria

| Do not Send to | Send to | |
|---|---|---|
| ○ | ⊙ | 1. All Seller's correspondents |
| ○ | ⊙ | 2. All Seller's brandhes/subsidiaries/affiliates |
| Do not Send to | Send to | 3. All banks located in Country |
| ⊙ | ○ | List of selected Countries<br>Indonesia<br>China<br>SAR<br>Singapore |
| Do not Send to | Send to | 4. All banks with branches and/or subsidiaries located in country |
| ⊙ | ○ | List of selected Countries<br>Indonesia<br>China<br>SAR<br>Singapore |
| Do not Send to | Send to | 6. All Non Banking Financial Institutions (NBFIs) located in country |
| ⊙ | ○ | List of selected Countries<br>Indonesia<br>China<br>SAR<br>Singapore |
| Do not Send to | Send to | 8. All Non Financial Institutions (Non-FIs) located in country |
| ⊙ | ○ | List of selected Countries<br>Indonesia<br>China<br>SAR<br>Singapore |
| | Send to ⊙ | 12. Special exceptions that override all previous choices of Seller's asset criteria and broad criteria for country selection |
| | | List of selected Counterparties<br>Banque Cantonale au Vaudoise<br>Zuercher Kantonalbank<br>Bank of Scotland |
| Do not Send to ⊙ | | 13. Special exceptions that override all previous choices of Seller's broad criteria for counterparty selection |
| | | List of selected Counterparties<br>GECC, subsidiaries & affiliates<br>Siemens Financial Services |

[Next to Describe Asset Offer]

Describe Asset Offer
Secondary: SELL: Asset Offer Guided Submission Describe Asset Offer: Worksheet
Disclaimer: The names and identities of counterparties and transactions utilized in the sample transaction are in no way similar to or representative of actual transactions or counterparties and are for demonstration purposes only.
Step 1: Describe Asset Offer : Worksheet
*obligatory field

| | |
|---|---|
| Form of ASSET on offer:* | ⊙ Draft(s)/Bill(s) of Exchange drawn under deferred payment (usance) Letter(s) of Credit (hG)<br>○ Site letter of credit requiring confirmation<br>○ Down payment on ECA (export credit agency) transaction, structured for deferred payment plus:<br>    Draft(s)<br>    Promissory note(s)<br>    Credit enhancement<br>    Letter(s) of credit<br>    Aval<br>○ Naked deferred payment claim:<br>    Draft<br>    Promissory note<br>○ Deferred payment claim(s) with credit enhancement<br>○ Deferred payment claim(s) with financial guarantee(s):<br>    Avalized Draft(s)<br>    Avalized Promissory note(s)<br>    Draft(s) with bank guarantee<br>    Promissory note(s) with guarantee |
| Type of Seller offering:* | ⊙ First Purchaser/Second Seller<br>○ Second Purchaser/Third Seller<br>○ Third Purchaser/Fourth Seller<br>○ Fourth Purchaser/Fifth Seller |
| *Type of transaction: | Without recourse financing ▼ |

-continued

OFFER:

| | | |
|---|---|---|
| *L/C ISSUING BANK | Bank of China | Latest News |
| *BRANCH | Shanghai | Credit Information |
| *L/C AMOUNT | 5,500,000.00 | Enhancement Tools |
| *CURRENCY | US Dollar ▼ | |
| *UNDERLYING TRANSACTION (GOODS) | Textile Equipment | |
| *MAXIMUM TENOR: | 720 days | |

○ AFTER SIGHT
   ◉ AFTER BILL OF LADING

*DAYS remaining    718
   + days
*AVERAGE LIFE    360
   + days

*Total NO. OF DRAFT(S)/
BILL(S) OF
EXCHANGE    4
*REPAYMENT    ◉ SEMIANNUAL
   [..........................]
   ○ ANNUAL
   [..........................]

DRAFT:*

*DRAFT NO. 1:
AMOUNT:    USD 1,375,000.00
MATURITY DATE: 15 Oct. 2001
TENOR:    178   + days

*DRAFT NO. 2:
AMOUNT:    USD 1,375,000.00
MATURITY DATE: 15 Apr. 2002
TENOR:    360   + days

*DRAFT NO. 3:
AMOUNT:    USD 1,375,000.00
MATURITY DATE: 10 Oct. 2002
TENOR:    538   + days

*DRAFT NO. 4:
AMOUNT:    USD 1,375,000.00
MATURITY DATE: 08 Apr. 2003
TENOR:    718   + days DRAFT NO. 5:
AMOUNT:
MATURITY DATE:
TENOR:    days DRAFT NO. 6:
AMOUNT:
MATURITY DATE:
TENOR:    days DRAFT NO. 7:
AMOUNT:
MATURITY DATE:
TENOR:    days DRAFT NO. 8:
AMOUNT:
MATURITY DATE:
TENOR:    days DRAFT NO. 9:
AMOUNT:
MATURITY DATE:
TENOR:    days DRAFT NO. 10:
AMOUNT:
MATURITY DATE:
TENOR:    days DRAFT NO. 11:
AMOUNT:
MATURITY DATE:
TENOR:    days DRAFT NO. 12:
AMOUNT:
MATURITY DATE:
TENOR:    days DRAFT NO. 13:
AMOUNT:
MATURITY DATE:
TENOR:    days DRAFT NO. 14:
AMOUNT:
MATURITY DATE:
TENOR:    days

*Importer: (Confidential Field)    'Shanghai Garment Ltd'
*L/C Advising Bank:
   (Confidential Field)    'Middle East Region Bank Ltd'
*Negotiating Bank:
   (Confidential Field)    'Middle East Region Bank Ltd'
*Payment Domicile:    Bank of China, Shanghai PRC
*Calendar used in days
   calculation (country)    UK
*Destination of Shipment    Shanghai PRC
Shipment of Origination (geographic)    [..........................]

Note: Confidential Fields only disclosed upon completion of Sale/Purchase MATCH and acceptance of MATCH terms.
Step 2: Terms of Offer: Worksheet
* obligatory field
TERMS OF OFFER
*Type of    (select calculator)
calculation:    ○ BOND
   ◉ Trade Finance discount methods:
     ◉ DISCOUNT-TO-YIELD (DTY)
       ○ Compounded annually
       ◉ Compounded semi-annually
     ○ STRAIGHT DISCOUNT (SD)
Interest rate    (Select one)
to be    ◉ Guideline
discounted    (or)
(Price)    ○ Offered (NOTE: THIS MEANS THE Seller
   IS FIRMLY REQUESTING NOT SUGGESTING
   A GUIDELINE)

-continued

| Interest Guideline/ | (Select one) |
|---|---|
| | ⊙ Libor + 1.375 % p.a. |
| | ○ Libor + ....... % FLAT |

| LIBOR Options:* | (Select one) |
|---|---|
| | ○ Matching AVERAGE LIFE |
| | ⊙ Matching the tenor of EACH DRAFT |
| | ⊙ Libor fixing 2 days before disbursement |
| INTEREST BASIS: | ⊙ 365 days over 360 days |
| | ○ 30 days in a month and 360 days in a year |
| DAYS OF GRACE: | ............ DAYS |

▓▓▓ ▓▓▓

+Apr. 20, 2001 was utilized as the calculation date in this transaction

Describe Asset Offer

Secondary: SELL: Asset Offer Guided Submission: Describe Asset Offer:

Guided Submission Seller's Worksheet

Disclaimer: The names and identifies of counterparties and transactions utilized in the sample transaction are in no way similar to or representative of actual transactions or counterparties and are for demonstration purposes only.

Step 3: Guided Documents Submission: Worksheet

Interactive guided process is available under Document and Procedures.

If scanning, prepare and authenticate electronic copies of documents to be submitted.

If faxing to GTFNet (Fax no: xxxxxxxx), please prepare complete set of documents indexed below under cover fax.

DOCUMENTATION (*Must respond Yes or No)

*(1) Certified True (Conformed) Copy of L/C issued together with all amendments

Have you, the Negotiating Bank made a Certified True (Conformed) Copy(s)?
⊙ yes ○ no ⊙ Submit a Certified True (Conformed) Copy(s) ........ ▓▓▓ ▓▓▓

○ Fax to GTFNet

*(2) Certified True (Conformed) Copy of a tested telex/SWITFT message from the L/C Issuing Bank to the Negotiating Bank confirming that the documents are in full compliance with the L/C terms and that USD 1,375,000.00 (amount) is due on 15/10/2001 (dd/mm/yyyy)
that USD 1,375,000.00 (amount) is due on 15/04/2002 (dd/mm/yyyy)
that USD 1,375,000.00 (amount) is due on 10/10/2002 (dd/mm/yyyy)
that USD 1,375,000.00 (amount) is due on 08/04/2003 (dd/mm/yyyy)

(Note: This field expands depending on the number of Draft(s) involved, usually not more than 14 in our case.)

[Do you have this document? ®) ⊙ yes ○ no]

Have you, the Negotiating Bank made a Certified True (Conformed) Copy(s)?
⊙ yes ○ no ⊙ Submit a Certified True (Conformed) Copy(s) ........ ▓▓▓ ▓▓▓

○ Fax to GTFNet

*(3) Confirmation from you, the Negotiating Bank, that the documents are in full compliance with the L/C terms and that USD 1,375,000.00 (amount) is due on 15/10/2001 (dd/mm/yyyy)
that USD 1,375,000.00 (amount) is due on 15/04/2002 (dd/mm/yyyy)
that USD 1,375,000.00 (amount) is due on 10/10/2002 (dd/mm/yyyy)
that USD 1,375,000.00 (amount) is due on 08/04/2003 (dd/mm/yyyy)

(Note: This field expands depending on the number of Draft(s) involved, usually not more than 14 in our case.)

[Do you have this document? ⊙ yes ○ no

Have you, the Negotiating Bank made a Certified True (Conformed) Copy(s)?
⊙ yes ○ no ⊙ Submit a Certified True (Conformed) Copy(s) ........ ▓▓▓ ▓▓▓

○ Fax to GTFNet

Either

*(4) (a) Bill(s) of Lading evidencing shipment

[Do you have this document? ⊙ yes ○ no]

Have you, the Negotiating Bank made a Certified True (Conformed) Copy(s)?
⊙ yes ○ no ⊙ Submit a Certified True (Conformed) Copy(s) ........ ▓▓▓ ▓▓▓

○ Fax to GTFNet

Or

*(4)(b) Certified True (Conformed). Copy of Cargo Receipt, signatures verified by L/C Issuing Bank

[Do you have this document? ○ yes ○ no]

Have you, the Negotiating Bank made a Certified True (Conformed) Copy(s)?
○ yes ○ no ○ Submit a Certified True (Conformed) Copy(s) [......] [Browse] [Upload]

○ Fax to GTFNet

*(4)(c) Certified True (Conformed) Copy of Commercial Invoice(s)

[Do you have this document? ○ yes ⊙ no]

Have you, the Negotiating Bank made a Certified True (Conformed) Copy(s)?
⊙ yes ○ no ⊙ Submit a Certified True (Conformed) Copy(s) [......] [Browse] [Upload]

○ Fax to GTFNet

*(4)(d) Certified True (Conformed) Copy(s) of all other underlying shipping documents pertinent to this shipment

[Do you have this document? ○ yes ⊙ no]

Have you, the Negotiating Bank made a Certified True (Conformed) Copy(s)?
○ yes ○ no ⊙ Submit a Certified True (Conformed) Copy(s) [......] [Browse] [Upload]

○ Fax to GTFNet

*(5)(a) Certified True (Conformed) Copy of the Letter of Assignment of proceeds under the L/C to the First Purchaser (who is the Seller) signed by the Exporter and addressed to Negotiating Bank (being the First Purchaser and Seller in this transaction).

[Do you have this document? ⊙ yes ○ no]

[Are you using form and content downloaded from GTFNet's Website?
⊙ yes ○ no]

"GTFNet Standard Document"

Have you, the Negotiating Bank made a Certified True (Conformed) Copy(s)?
⊙ yes ○ no ⊙ Submit a Certified True (Conformed) Copy(s) [......] [Browse] [Upload]

○ Fax to GTFNet

*(5)(b) Certified True (Conformed) Copy of the Letter of Assignment of proceeds under the commercial invoice to the First Purchaser (Seller) signed by the Exporter and addressed to Seller (being the Negotiating Bank).

[Do you have this document? ⊙ yes ○ no]

[Are you using form and content downloaded from GTFNet's Website?
⊙ yes ○ no]

"GTFNet Standard Document"

Have you, the Negotiating Bank made a Certified True (Conformed) Copy(s)?
⊙ yes ○ no ⊙ Submit a Certified True (Conformed) Copy(s) [......] [Browse] [Upload]

○ Fax to GTFNet

*Select either (6) or (7)

(6) Draft(s)/Bill(s) of Exchange endorsed without recourse by the Exporter to the order of Seller, being the First Purchaser

ORIGINAL DOCUMENT TO BE DELIVERED AT CLOSING

[Do you have this document? ○ yes ○ no]

[Are you using form and content downloaded from GTFNet's Website?
○ yes ○ no]

"GTFNet Standard Document"

Have you, the Negotiating Bank made a Certified True (Conformed) Copy(s)?
○ yes ○ no ○ Submit a Certified True (Conformed) Copy(s) [......] [Browse] [Upload]

○ Fax to GTFNet (7) Certified True (Conformed) Copy of the Telex Acceptance of the Draft(s)/Bill(s) of Exchange in the case of a telex acceptance in lieu of original Draft(s)/Bill(s) of Exchange.

Telex Acceptance of the Draft(s)/Bill(s) of Exchange:

The Certified True (Conformed) Copy of a tested/SWIFT message from the LIC Issuing Bank to the Negotiating Bank stating that the L/C Issuing Bank has accepted the draft (Bill(s) of Exchange), confirms the amount(s) due on day/month/year date(s) and that the bank will under no circumstances release the Bill(s) of Exchange to any other party, person or institution other than Exporter or its assignee(s) and undertakes to pay upon presentation in effective currency at maturity the referenced amount(s), without any deductions whatsoever, to the Exporter and or its assignee(s).

[Do you have this document? ⊙ yes ○ no]

[Are you using form and content downloaded from GTFNet's Website?
⊙ yes ○ no]

"GTFNet Standard Document"

---

Have you, the Negotiating Bank made a Certified True (Conformed) Copy(s)?
⊙ yes    ○ no ⊙ Submit a Certified True (Conformed) Copy(s) [..........] [Browse] [Upload]
○ Fax to GTFNet

---

*(8) Verification from the Negotiating Bank that Exporter's signature(s) appearing on documentation is/are authentic and the signatory(s) is/are authorised to sign (singly/jointly) on behalf of the Exporter

[Do you have this document? ⊙ yes ○ no]

[Are you using form and content downloaded from GTFNet's Website?
    ○ yes ⊙ no]

"GTFNet Standard Document"

---

Have you, the Negotiating Bank made a Certified True (Conformed) Copy(s)?
⊙ yes    ○ no ⊙ Submit a Certified True (Conformed) Copy(s) [..........] [Browse] [Upload]
○ Fax to GTFNet

---

*(9) Do you, the Seller, being the First Purchaser as well as the Negotiating Bank have a Purchase Contract signed with the Exporter?
    ⊙ yes ○ no

[Have you used form and content downloaded from GTFNet's Website?
    ⊙ yes ○ no]

"GTFNet Standard Document"

*(10) Certified True (Conformed) Copy of the letter of notification from Exporter to Issuing Bank in which the Exporter notifies the L/C Issuing Bank of the assignment of the proceeds to the First Purchaser, who is the Negotiating Bank and the Seller.

[Do you have this document? ⊙ yes ○ no]

[Will you be using form and content downloaded from GTFNet's Website?
    ○ yes ⊙ no]

"GTFNet Standard Document"

---

Have you, the Negotiating Bank made a Certified True (Conformed) Copy(s)?
⊙ yes    ○ no ⊙ Submit a Certified True (Conformed) Copy(s) [..........] [Browse] [Upload]
○ Fax to GTFNet

---

*(11) Certified True (Conformed) Copy of tested telex/SWIFT message from Issuing Bank acknowledging assignment of proceeds in favour of First Purchaser (Second Seller) and agreement to pay the First Purchaser with no deductions.

[Do you have this document? ⊙ yes ○ no]

[Will you be using form and content downloaded from GTFNet's Website?
    ⊙ yes ○ no]

"GTFNet Standard Document"

---

Have you, the Negotiating Bank made a Certified True (Conformed) Copy(s)?
⊙ yes    ○ no ⊙ Submit a Certified True (Conformed) Copy(s) [..........] [Browse] [Upload]
○ Fax to GTFNet

---

Will you, the Seller, undertake to obtain and deliver the following documentation which is not already in our possession, in the event the Buyer makes the following requests?

*(12) Certified True (Conformed) Copy of the notification from the Seller to L/C Issuing Bank that the Seller has assigned the claim to the Buyer (Second Purchaser). ⊙ yes ○ no

[Will you send this notification using the form and content downloaded from GTFNet's Website?
    ⊙ yes ○ no]

"GTFNet Standard Document"

*(13) (ORIGINAL Draft(s)/Bill(s) of Exchange endorsed without recourse by the Exporter to the order of the Second Seller (First Purchaser) and endorsed by the Second Seller without recourse to the Buyer (being the Second Purchaser).
ORIGINAL DOCUMENT WILL BE DELIVERED ○ yes ⊙ no

[Will you using form and content downloaded from GTFNet's Website?
    ○ yes ⊙ no]

"GTFNet Standard Document"

Either

*(14)(a) (Certified True (Conformed) Copy of the Telex from the L/C Issuing Bank acknowledging their acceptance of the assignment of the claim by the First Purchaser being the Second Seller and their obligation to pay irrevocably the Buyer (being the Second Purchaser). ⊙ yes ○ no

[Will you make this request using form and content downloaded from GTFNet's Website?]
    ⊙ yes ○ no ○ BEST EFFORTS "GTFNet Standard Document"

Or

*(14)(b) Will you request a telexAcceptance of the Bill(s) of Exchange and deliver a Certified True Copy to the Second Purchaser? Note: Imbedded in tested telex is the Certified True (Conformed) Copy of a tested telex/SWIFT message from the L/C Issuing Bank to the Negotiating Bank stating that the L/C Issuing Bank has accepted the draft (Bill(s) of Exchange), confirms the amounts due on

15/10/01, 15/04/02, 10/

(dates) and the assignment of the claim(s) to the Buyer (being the Second Purchaser) and that the L/C Issuing Bank will under no circumstances release the Bill(s) of Exchange to any other party, person or institution other than the assignee, the Buyer (being the Second Purchaser) and undertakes to pay upon presentation in effective currency at maturity the referenced amounts, without any deductions whatsoever, to the assignee, the Buyer (being the Second Purchaser.) ⊙ yes ○ no

[Will you make this request using form and content downloaded from GTFNet's Website?]
    ⊙ yes ○ no ○ BEST EFFORTS "GTFNet Standard Document"

(15)(a) In the event that the L/C Issuing Bank should refuse to change the payment route established under the L/C, the Negotiating Bank will issue an irrevocable payment instruction to its correspondence in the country of the currency in which the draft and L/C are denominated. ○ yes ○ no (15)(b) Will this irrevocable payment instruction indicate that upon receipt of the funds, the Correspondent Bank must wire the funds directly to the Second Purchaser and not credit the Negotiating Bank's account.
    ○ yes ○ no (15)(c) Will you deliver a Certified True (Conformed) Copy of this instruction to the Buyer (being the Second Purchaser) ○ yes ○ no

[Will you be using form and content downloaded from GTFNet's Website?
    ○ yes ○ no]

"GTFNet Standard Document"

*(16) The Seller, being the First Purchaser and Second Seller will sign a Purchase Contract signed with the Buyer, the Second Purchaser.
    ⊙ yes ○ no

[Will you use form and content downloaded from GTFNet's Website?
    ⊙ yes ○ no]

"GTFNet Standard Document"

*(17) The First Purchaser, being Second Seller will provide the Buyer, being the Second Purchaser with a current list of authorised signatories of the Second Seller, being the First Purchaser to the Buyer, being the Second Purchaser?

[Do you have this document? ⊙ yes ○ no]

---

Have you, the Negotiating Bank, made a Certified True (Conformed) Copy(s)?
    ○ yes ○ no ○ Submit a Certified True (Conformed) Copy(s) .......... 
○ Fax to GTFNet
(18) Will you request custodian services? ○ yes ⊙ no

HANDLE Assigned "Harvy 3"

[Posting on GTFNet: The system will generate a random number and/or alphanumeric combination and assign it to this specific asset offer of Seller.] Please fax under cover of the Seller's letterhead including all documents in possession of the Seller at this time. If any documents indicated above are not yet ready for submission, please indicate in your fax that such documents will follow.

Note: Assistance is available under Documents and Procedures Guided Process.

Documentation Under Legal Counsel Review

Once the seller has completed the document to its satisfaction it submits it by clicking the 'submit offer' button. The offering will then be allocated an alphanumeric code to assure the seller's anonymity, "Harvy 3" in this case, and will be displayed 52 along with other offerings on the platform.

Prospective buyers are able to view 53 all suitable offerings that are available (according to criteria previously set by sellers). These criteria may be dynamically adjusted for instance as its credit line availability changes.

---

Indicate Buyer's Appetite
Secondary: BUY:Indicate Buyer's Appetite:Worksheet
Disclaimer: The names and identities of counter parties and transactions utilized in the sample transaction are in no way similar to or representative of actual transactions or counter parties and are for demonstration purposes only.

Buyer's Appetite and Line Availability as at

Country List Selection (dd/mm/yyyy)
(Note: This can be frequently and interactively updated at the discretion of the Buyer,)

| Country | Bank | Tenor Days | Currency | Line Availability |
|---|---|---|---|---|
| Bahrain | Faisal Islamic Bank | 1080 | USD | 5,000,000 |
| Brazil | Banco Itau | 360 | USD | 5,000,000 |
| China | Agricultural Bank of China | 1080 | USD | 3,500,000 |
|  | Bank of China | 2520 | USD | 11,500,000 |
|  | China Construction Bank | 1800 | USD | 5,000,000 |
|  | Industrial and Commercial Bank of China | 1800 | USD | 4,500,000 |
| Czech Republic | Ceskoslovenska Obchodni Banksa | 1800 | Euro | 5,000,000 |
| Egypt | National Bank of Egypt | 1080 | USD | 10,000,000 |
| Finland | Kansalliza Bank | 2520 | Euro | 8,000,000 |
|  | Posti Pankki | 1440 | Euro | 3,000,000 |
| Hungary | Hungarian Foreign Trade Bank | 1440 | Euro | 5,000,000 |
| India | State Bank of India | 2520 | USD | 8,000,000 |
| Romania | Foreign Trade Bank | 1080 | Euro | 4,000,000 |
|  | Banca Agricola | 1080 | Euro | 4,000,000 |
| South Korea | Korea Exchange Bank | 1080 | USD | 3,000,000 |
| Malaysia | Bumiputra Commerce Bhd | 900 | USD | 8,000,000 |
|  | Malayan Banking Bhd | 900 | USD | 7,000,000 |
| Morocco | Banque Commerciale du Maroc | 1080 | Euro | 5,000,000 |
|  | Credit du Maroc | 1080 | Euro | 5,000,000 |
| Saudi Arabia | National Commercial Bank | 1800 | Euro | 10,000,000 |

-continued

Indicate Buyer's Appetite
Secondary: BUY:Indicate Buyer's Appetite:Worksheet
Disclaimer: The names and identities of counter parties and transactions utilized in the sample transaction are in no way similar to or representative of actual transactions or counter parties and are for demonstration purposes only.

Buyer's Appetite and Line Availability as at

(dd/mm/yyyy)
(Note: This can be frequently and interactively updated at the discretion of the Buyer,)

| Country | Bank | Tenor Days | Currency | Line Availability |
|---|---|---|---|---|
| Thailand | Thai Farmers Bank | 1800 | USD | 5,000,000 |
| Tunisia | Banque BIAT | 1800 | Euro | 3,000,000 |
| Turkey | Garantie Bankasi | 1800 | Euro | 7,500,000 |
|  | TC Ziraat Bankasi | 1800 | Euro | 5,000,000 |

Submit

There is also an option to remove all viewing criteria and view all other transactions for which the viewer qualifies as per seller instructions and to then auto-reinstate the criteria. Upon viewing all suitable offerings available to the buyer(s), the buyer can select those transactions of interest for further consideration, mark and file them in the buyer/user's management system (provided by the platform) for various categories, status and priorities, as the transaction progresses or matures the transaction moves or is moved from file to file, status and priority. For instance a buyer will see only the following three transactions that matched its 'set' interest criteria when the criteria screening is in effect. These criteria may be dynamically adjusted for instance as its credit line availability changes.

Assets meeting Buyer's Criteria: Summary

Secondary: BUY: Assets meeting Buyer's Criteria: Summary

Disclaimer: The names and identities of counterparties and transactions utilized in the sample transaction are in no way similar to or representative of actual transactions or counterparties and are for demonstration purposes only.

Assets meeting Buyer's Criteria Summary as at (dd/mm/yyyy)

View Assets in Sequence Received [View Assets in Sequence Received]

1.
| Transaction Handle: | Harvy3 | Latest News |
|---|---|---|
| L/C ISSUING BANK: | Bank of China | Credit Information |
| L/C AMOUNT: | USD 5.5 MM | Enhancement Tools |
| Total No. of Draft(s)/ Bill(s) of Exchange: | 4 | |
| Interest Guideline/ offered: | Libor + 1.375% p.a. | |
| Days Remaining: | 718 days + | |
| Maximum Tenor: | 720 days | |
|  | <View Terms> | |
|  | <View Documentation> | |
|  | <View Complete Offer> | |

2.
| Transaction Handle: | Dunget3 | Latest News |
|---|---|---|
| L/C ISSUING BANK: | National Bank of Egypt | Credit Information |
| L/C AMOUNT: | Euro 7.83 MM | Enhancement Tools |
| Total No. of Draft(s)/ Bill(s) of Exchange: | 5 | |
| Interest Guideline/ offered: | Libor + 2.5% p.a. | |
| Days Remaining: | 875 days + | |
| Maximum Tenor: | 900 days | |
|  | <View Terms> | |
|  | <View Documentation> | |
|  | <View Complete Offer> | |

3.
| Transaction Handle: | Pefla72 | Latest News |
|---|---|---|
| L/C ISSUING BANK: | Ceskoslovenska ObchodniBanka | Credit Information |
| L/C AMOUNT: | USD 14.5 MM | Enhancement Tools |
| Total No. of Draft(s)/ Bill(s) of Exchange: | 10 | |
| Interest Guideline/ offered: | Libor + 1.875% p.a. | |
| Days Remaining: | 1610 days + | |
| Maximum Tenor: | 1800 days | |
|  | <View Terms> | |
|  | <View Documentation> | |
|  | <View Complete Offer> | |

+Apr. 20, 2001 was utilized as the calculation date in this transaction

The buyer sees a condensed form of the documents completed by the sellers since they only see the fields that have been completed by the seller. At the same time the buyer sees high level information so that the eye can scan many transactions, and drill down to see, terms details of standard documents, seller's documents, or complete offer. The buyer can flexibly move in and out of any of these documents and categories. The buyer then has the option to flag transactions and documents of interest for further consideration, one such flagged transaction as follows:

Flagged Asset meeting Buyer's Criteria: Details

Secondary: BUY: Flagged Asset meeting Buyer's Criteria: Details

Disclaimer: The names and identities of counterparties and transactions utilized in the sample transaction are in no way similar to or representative of actual transactions or counterparties and are for demonstration purposes only.

| | Details of Asset | |
|---|---|---|
| Seller Category: | BANK (B) | |
| Branch | x | |
| Seller Name | | |
| City, Country | | |
| Region | | |
| Credit Rating (if any) | Fitch IBCA Rating—A (long term) | |
| Credit reports published by Fitch IBCA | Yes | |
| Capital | USD 200 MM | |
| Assets | USD 2.7 Bn | |
| Seller Offer Asset Offer | HANDLE: "Harvy3" | |
| Form of ASSET on offer: | ⊙ Draft(s)/Bill(s) of Exchange drawn under deferred payment (usance) letter of credit(s) | |
| Type of Seller offering: | ⊙ First Purchaser/Second Seller | |
| OFFER: | Type of transaction: Without recourse financing | |
| L/C ISSUING BANK: | Bank of China | Latest News |
| BRANCH: | Shanghai | Credit Information |
| L/C AMOUNT: | USD 5,500,000.00 | Enhancement Tools |

-continued

| Details of Asset | | |
|---|---|---|
| UNDERLYING TRANSACTION | | |
| (GOODS) | Textile Equipment | |
| MAXIMUM TENOR ⊙ AFTER BILL OF LADING | 720 days | |
| DAYS remaining | 718 days + | |
| AVERAGE LIFE | 360 days + | |
| Total NO. OF DRAFT(S)/ BILL(S) OF EXCHANGE | 4 | |
| REPAYMENT DRAFT: | ⊙ SEMIANNUAL DRAFT NO. 1: | |
| | AMOUNT: | 1,375,000.00 |
| | MATURITY DATE: | 15/10/01 |
| | TENOR: | 178 + days |
| | DRAFT NO. 2: | |
| | AMOUNT: | 1,375,000.00 |
| | MATURITY DATE: | 15/04/02 |
| | TENOR: | 360 + days |
| | DRAFT NO. 3: | |
| | AMOUNT: | 1,375,000.00 |
| | MATURITY DATE: | 10/10/02 |
| | TENOR: | 538 + days |
| | DRAFT NO. 4: | |
| | AMOUNT: | 1,375,000.00 |
| | MATURITY DATE: | 08/04/03 |
| | TENOR: | 718 + days |
| Payment Domicile: | Bank of China, Shanghai | |
| Calendar used in days calculation (country) | UK | |
| DESTINATION OF SHIPMENT | Shanghai | |

Terms of Offer

| TERMS OF OFFER | |
|---|---|
| Type of calculation | ⊙ Trade Finance discount methods: ⊙ DISCOUNT-TO-YIELD (DTY) ⊙ Compounded semi-annually |
| Interest rate to be discounted (Price): | ⊙ Guideline |
| Interest Guideline/ offered: | ⊙ Libor + 1.375% p.a. |
| LIBOR Options: | ⊙ Libor fixing 2 days before disbursement |
| INTEREST BASIS: | ⊙ 365 days over 360 days |
| DAYS OF GRACE: | 0 DAYS |

DAYS OF GRACE:

Due to trade finance practitioners' historical experience of delays in repayments and settlement procedures with certain countries and/or guaranteeing banks, the practice of anticipating these delays and factoring them into the discounting developed and these days are known as "days of grace". They are added to the final maturity and thereby discounted in advance whether actual or not.

Payment Maximum 21 days from Sale/Purchase MATCH Settlement Period:

Next

+Apr. 20, 2001 was utilized as the calculation date in this transaction

Flagged Asset meeting Buyer's Criteria—Details

Secondary: BUY: Flagged Asset meeting Buyer's Criteria—Details

Disclaimer: The names and identities of counterparties and transactions utilized in the sample transaction are in no way similar to or representative of actual transactions or counterparties and are for demonstration purposes only.

Documentation

Interactive guided process is available under Documents and Procedures.

DOCUMENTATION (1) Certified True (Conformed) Copy of L/C issued together with all amendments Have you, the Negotiating Bank made a Certified True (Conformed) Copy(s)? ⊙ yes <View Seller's Documents>

(2) Certified True (Conformed) Copy of a tested telex/SWIFT message from the L/C Issuing Bank to the Negotiating Bank confirming that the documents are in full compliance with the L/C terms and that USD 1,375,000.00 (amount) is due on 15/10/2001 (dd/mm/yyyy)

that USD 1,375,000.00 (amount) is due on 15/04/2002 (dd/mm/yyyy)

that USD 1,375,000.00 (amount) is due on Oct. 10, 2002 (dd/mm/yyyy)

that USD 1,375,000.00 (amount) is due on Aug. 4, 2003 (dd/mm/yyyy)

(Note: This field expands depending on the number of drafts involved, usually not more than 14 in our case.)

[Do you have this document? ⊙ yes]

Have you, the Negotiating Bank, made a Certified True (Conformed) Copy(s)? ⊙ yes <View Seller's Documents>

(3) Confirmation from you, the Negotiating Bank, that the documents are in full compliance with the L/C terms and that USD 1,375,000.00 (amount) is due on 15/10/2001 (dd/mm/yyyy)

that USD 1,375,000.00 (amount) is due on 15/04/2002 (dd/mm/yyyy)

that USD 1,375,000.00 (amount) is due on Oct. 10, 2002 (dd/mm/yyyy)

that USD 1,375,000.00 (amount) is due on Aug. 4, 2003 (dd/mm/yyyy)

(Note: This field expands depending on the number of drafts involved, usually not more than 14 in our case.)

[Do you have this document? ⊙ yes]

Have you, the Negotiating Bank, made a Certified True (Conformed)

Copy(s)? ⊙ yes <View Seller's Documents>

Either (4)(a) Bill(s) of Lading evidencing shipment

[Do you have this document? ⊙ yes]

Have you, the Negotiating Bank, made a Certified True (Conformed) Copy(s)? ⊙ yes <View Seller's Documents>

(4)(c) Certified True (Conformed) Copy of Commercial Invoice(s)

[Do you have this document? ⊙ yes]

Have you, the Negotiating Bank, made a Certified True (Conformed) Copy(s)? ⊙ yes <View Seller's Documents>

(4)(d) Certified True (Conformed) Copy(s) of all other underlying shipping documents pertinent to this shipment

[Do you have this document? ⊙ no]

(5)(a) Certified True (Conformed) Copy of the Letter of Assignment of proceeds under the L/C to the First Purchaser (who is the Seller) signed by the Exporter and addressed to Negotiating Bank (being the First Purchaser and Seller in this transaction).

[Do you have this document? ⊙ yes]

Have you, the Negotiating Bank, made a Certified True (Conformed) Copy(s)? ⊙ yes <View Seller's Documents>

(5)(b) Certified True (Conformed) Copy of the Letter of Assignment of proceeds under the commercial invoice to the First Purchaser (Seller) signed by the Exporter and addressed to Seller (being the Negotiating Bank).

[Do you have this document? ⊙ yes]

[Are you using form and content downloaded from GTFNet's Website?
    ⊙ yes ○ no]

"GTFNet Standard Document"

Have you, the Negotiating Bank, made a Certified True (Conformed) Copy(s)? ⊙ yes <View Seller's Documents>

Select either (6) or (7)

(7) Certified True (Conformed) Copy of the Telex Acceptance of the Draft(s)/Bill(s) of Exchange in the case of a telex acceptance in lieu of original Draft(s)/Bill(s) of Exchange.

Telex Acceptance of the Draft(s)/Bill(s) of Exchange:

The Certified True (Conformed) Copy of a tested telex/SWIFT message from the L/C Issuing Bank to the Negotiating Bank stating that the L/C Issuing Bank has accepted the Draft(s)/Bill(s) of Exchange, confirms the amounts due on dav/monthlvear date(s) and that the bank will under no circumstances release the Bill(s) of Exchange to any other party, person or institution other than Exporter and or its assignee(s) and undertakes to pay upon presentation in effective currency at maturity the referenced amounts, without any deductions whatsoever, to the Exporter and or its assignee(s).

[Do you have this document? ⊙ yes]

[Are you using form and content downloaded from GTFNet's Website?
    ⊙ yes]

"GTFNet Standard Document"

Have you, the Negotiating Bank, made a Certified True (Conformed) Copy(s)? ⊙ yes <View Seller's Documents>

(8) Verification from the Negotiating Bank that Exporter's signature(s) appearing on documentation is/are authentic and the signatory(s) is/are authorised to sign (singly/jointly) on behalf of the Exporter.

[Do you have this document? ⊙ yes]

[Are you using form and content downloaded from GTFNet's Website?
    ⊙ no]

"GTFNet Standard Document"

Have you, the Negotiating Bank, made a Certified True (Conformed) Copy(s)? ⊙ yes <View Seller's Documents>

(9) Do you, the Seller, being the First Purchaser as well as the Negotiating Bank have a Purchase Contract signed with the Exporter? ⊙ yes ○ no

[Have you used form and content downloaded from GTFNet's Website?
    ○ yes ⊙ no]

"GTFNet Standard Document"

(10) Certified True (Conformed) Copy of the Letter of Notification from Exporter to Issuing Bank in which the Exporter notifies the L/C Issuing Bank of the assignment of the proceeds to the First Purchaser, who is the Negotiating Bank and the Seller.

[Do you have this document? ⊙ yes]

[Will you be using form and content downloaded from GTFNet's Website?
    ⊙ no]

"GTFNet Standard Document"

Have you, the Negotiating Bank, made a Certified True (Conformed) Copy(s)? ⊙ yes <View Seller's Documents>

(11) Certified True (Conformed) Copy of tested telex/SWIFT message from Issuing Bank acknowledging assignment of proceeds in favour of First Purchaser (Second Seller) and agreement to pay the First Purchaser with no deductions.

[Do you have this document? ⊙ yes]

[Will you be using form and content downloaded from GTFNet's Website?
    ⊙ yes]

"GTFNet Standard Document"

Have you, the Negotiating Bank, made a Certified True (Conformed) Copy(s)? ⊙ yes <View Seller's Documents>

Will you, the Seller, undertake to obtain and deliver the following documentation which is not already in our possession, in the event the Buyer makes the following requests?

(12) Certified True (Conformed) Copy of the notification from the Seller to L/C Issuing Bank that the Seller has assigned the claim to the Buyer (Second Purchaser). ⊙ yes

[Will you send this notification using the form and content downloaded from GTFNet's Website?
    ⊙ yes]

"GTFNet Standard Document"

(13) (ORIGINAL Draft(s)/Bill(s) of Exchange endorsed without recourse by the Exporter to the order of the Second Seller (First Purchaser) and endorsed by the Second Seller without recourse to the Buyer (being the Second Purchaser).

ORIGINAL DOCUMENT TO BE DELIVERED ⊙ no

[Will you be using the form and content downloaded from GTFNet's Website?
  ⊙ no]

"GTFNet Standard Document"

Either (14)(a) Certified True (Conformed) Copy of the Telex from the L/C Issuing Bank acknowledging their acceptance of the assignment of the claim(s) by the First Purchaser being the Second Seller and their obligation to pay irrevocably the Buyer (being the Second Purchaser). ⊙ yes

[Will you make this request using the form and content downloaded from GTFNet's Website?
  ⊙ yes]

"GTFNet Standard Document"

Or (14)(b) Will you request a telexAcceptance of the Bill(s) of Exchange and deliver a Certified True Copy to the Second Purchaser?

Tested telex/SWIFT message from the L/C Issuing Bank to the Negotiating Bank stating that the L/C Issuing Bank has accepted the Draft(s)/Bill(s) of Exchange, confirms the amounts due on 15/10/01, 15/04/02, 10/10/02, 08/04/03 (dates) and the assignment of the claim(s) to the Buyer (being the Second Purchaser) and that the L/C Issuing Bank will under no circumstances release the Bill(s) of Exchange to any other party, person or institution other than the assignee, the Buyer (being the Second Purchaser) and undertakes to pay upon presentation in effective currency at maturity the referenced amounts, without any deductions whatsoever, to the assignee, the Buyer (being the Second Purchaser). ⊙ yes

[Will you make this request using form and content downloaded from GTFNet's Website?
  ⊙ yes]

"GTFNet Standard Document"

(15)(a) In the event that the L/C Issuing Bank should refuse to change the payment route established under the L/C, the Negotiating Bank will issue an irrevocable payment instruction to its correspondent in the country of the currency in which the draft and L/C are denominated.

(15)(b) Will this irrevocable payment instruction indicate that upon receipt of the funds, the Correspondent Bank must wire the funds directly to the Second Purchaser and not credit the Negotiating Bank's account.

(15)(c) Will you deliver a Certified True (Conformed) Copy of this instruction to the Buyer (being the Second Purchaser).

[Will you be using form and content downloaded from GTFNet's Website?
  ○ yes ○ no]

"GTFNet Standard Document"

(16) The Seller, being the First Purchaser and Second Seller will sign a Purchase Contract signed with the Buyer, the Second Purchaser. ⊙ yes

[Will you use form and content downloaded from GTFNet's Website?
  ⊙ yes]

"GTFNet Standard Document"

(17) The First Purchaser, being Second Seller will provide the Buyer, being the Second Purchaser with a current list of authorised signatories of the Second Seller, being the First Purchaser to the Buyer, being the Second Purchaser?

[Do you have this document? ⊙ yes]

(18) Will you request custodian services? ⊙ no

---

<View Seller's Documents>

 

 

The buyer can then decide to accept the offer or negotiate the offer by making a first counter offer against the offer by filling in the following counteroffer document 55. In this counter offer document the buyer indicates that it is wants to negotiate price, terms, calculation used to arrive at the terms, documents to be provided including those not yet nominated in the offer document, content of documents to be provided and other conditions. In this transaction example the buyer is willing to purchase three out of the four drafts on the conditions shown. The buyer has the flexibility to indicate whether he 'requests' or 'requires' documents and to obtain answers that 'commit', refuse or indicate 'best efforts' as the case may be, emulating the flexibility of a voice negotiation. When the counteroffer is completed to the buyer's satisfaction, the buyer submits it, by clicking the 'Submit Counteroffer' button, and the counter offer is subsequently received by the seller 56.

Buyer's Active Counteroffers: Asset #1

Secondary: BUY: Buyer's Active Counteroffers: Asset #1: First Counteroffer

Disclaimer: The names and identities of counterparties and transactions utilized in the sample transaction are in no way similar to or representative of actual transactions or counterparties and are for demonstration purposes only.

Response from Buyer Handle: "Joes9"

To Seller Handle: "Harvy3"

"Found Match Let's Negotiate"

---

Buyer's Active Counteroffers: Asset #1
L/C ISSUING BANK:   Bank of China           Latest News
L/C AMOUNT:         USD 5,500,000.00        Credit Information
MAXIMUM TENOR:      720 days                Enhancement Tools
Do you wish to negotiate price/terms?       ⊙ yes
                                            ○ no
Do you wish to negotiate document terms and ⊙ yes
conditions?                                 601 no
Reminder: There is a GTFNet Transaction Fee to be paid by the Buyer
Please indicate each field to be negotiated.
[In this example, three fields are proposed for negotiation.]
"Found Match Let's Negotiate"
Buyer requests Seller's second offer to Buyer's counteroffer:
                                            Calculator
1.  The Buyer requests the following changes to the terms, does the
    Seller agree?

-continued

Buyer willing to purchase [3] Drafts out of 4 Drafts
  o yes
  o no
DRAFT NO. 02:
Libor + [1.50]% p.a. o yes o no
DRAFT NO. 03:
Libor + [1.675]% p.a. o yes o no
DRAFT NO. 04:
Libor + [1.75]% p.a. o yes o no
Days of Grace [4]

2. Buyer [requires ▼] modifications to existing documents:

Document #(8)
Verification FROM THE NEGOTIATING
BANK that the Exporter's signature(s)
appearing on documentation is/are authentic
and the signatory(s) is/are authorised to sign o Yes
(singly/jointly) on behalf of the Exporter o No
Using form and content downloaded from
GTFNet's Website?

o Yes
  o No
*GTFNet Standard Document

3. Buyer [requires ▼] additional documents from the Seller.

Will Seller agree to deliver?
In the event that it would not be possible to requires ▼ obtain 14(a)(b), will the Seller agree on a o Yes
"BEST EFFORTS"basis to obtain
15(a)(b)(c)? o No
  o BEST EFFORTS (14)(a) Telex from the L/C Issuing Bank requires ▼ acknowledging their acceptance of o Yes
  the assignment of the claim by the o No
  First Purchaser being the Second o BEST EFFORTS
  Seller and their obligation to pay
  irrevocably the Buyer (being the
  Second Purchaser].

(14)(b) A Certified True (Conformed) requires ▼

Copy of a telex Acceptance of the o Yes
  Bills of Exchange and deliver a o No
  Certified True Copy to the Second o BEST EFFORTS
  Purchaser.

(15)(a) In the event that the L/C Issuing requires ▼

Bank should refuse to change the o Yes
  payment route established under o No
  the L/C, the Negotiating Bank will o BEST EFFORTS
  issue an irrevocable payment
  instruction to its correspondent in
  the country of the currency in
  which the draft and L/C are
  denominated.

(15)(b) This irrevocable payment instruc- requires ▼ tion indicates that upon receipt of o Yes
  the funds, the Correspondent Bank o No
  must wire the funds directly to o BEST EFFORTS
  the Second Purchaser and not
  credit the Negotiating Bank's
  account.

(15)(c) A Certified True (Conformed) requires ▼

Copy of this instruction to the o Yes
  Buyer (being the Second o No
  Purchaser). o BEST EFFORTS -continued The form and content downloaded from GTFNet's Website is requested.
  o Yes
  o No
*GTFNet Standard Document
 (16) Buyer [requires ▼] New Document: o Yes
  SAFE Approval o No
L/C ISSUING BANK Bank of China
L/C AMOUNT USD 5,500,000.00
MAXIMUM TENOR 720 days
<View Seller's Documents>

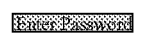 

Reminder: There is a GTFNet Transaction Fee to be paid by the Buyer

Document Under Legal Counsel Review

The seller then makes a second offer 57 in response to the buyer's first counter offer by filling in another counteroffer document. In this document the seller offers to sell two out of the four drafts, changes the terms, changes the calculations used to arrive at the terms, offers some revised documents and offers some new documents required by the potential purchaser in its counter offer.

When looking at the transaction(s) from the seller's view, as below, one can see at the top of the seller's second offer page the summary of other offers on this receivable that the seller has received. These other offers may include stand alone offers on the other remaining drafts and the seller may choose to sell those elsewhere, in other words to mix and match offers and counter offers in order to sell all of the drafts associated with this specific export. Multiple negotiations can be carried out simultaneously by one counter party. The system supports and assists the stripping of these assets into component parts for sale separately.

Match Negotiate Active Files

Secondary: SELL: Match Negotiate Active Files: Seller's Second Offer: Index

Disclaimer: The names and identities of counterparties and transactions utilized in the sample transaction are in no way similar to or representative of actual transactions or counterparties and are for demonstration purposes only.

| Files Listed in Alphabetical Order of Seller Handle | | | | |
| --- | --- | --- | --- | --- |
| 1. Seller Handle: | Harvy3 | Buyer Handle: | Joes9 | ⊙ |
| 2. Seller Handle: | Gudj1 | Buyer Handle: | Binto10 | ○ |
| 3. Seller Handle: | Mum43 | Buyer Handle: | Tjot22 | ○ |

Match Negotiate Active Files

Secondary: SELL: Match Negotiate Active Files: Seller's Second Offer

Disclaimer: The names and identities of counterparties and transactions utilized in the sample transaction are in no way similar to or representative of actual transactions or counterparties and are for demonstration purposes only.

| Transaction History | | |
|---|---|---|
| Seller Handle: "Harvy3" | Seller's Offer | |
| Buyer Handle: "Joes9" | Buyer's Counteroffer | |
| | >>Seller's Second Offer | |
| L/C ISSUING BANK | Bank of China | Latest News |
| L/C AMOUNT | USD 5,500,000.00 | Credit Information |
| MAXIMUM TENOR | 720 days | Enhancement Tools |
| <View Terms > | | |
| <View Complete Offer> | | |
| <View Seller's Documents> | | |
| Match Negotiate Active Files | | |

Calculator

1. Seller proposes the following changes to Buyer's Counteroffer
Number of Drafts: Buyer Counteroffers to purchase 3 Drafts out of 4 Drafts
Seller's Offer to sell ☒ Drafts out of 4 Drafts 2. Seller accepts the following terms of Buyer's Counteroffer
Select DRAFT(s):
DRAFT NO. 1:
AMOUNT: USD 1,375,000.00
MATURITY DATE: 15/10/01
TENOR: 178 days +
○ Yes  DRAFT NO. 02:
⊙ No  AMOUNT: USD 1,375,000.00
MATURITY DATE: 15/04/02
TENOR: 360 days +
Libor + 1.50% p.a.
☐ Matching Libor for this draft + margin
⊙ Yes  DRAFT NO. 03:
○ No  AMOUNT: USD 1,375,000.00
MATURITY DATE: 10/10/02
TENOR: 538 days +
Libor + 1.675% p.a.
☑ Matching Libor for this draft + margin
⊙ Yes  DRAFT NO. 04:
○ No  AMOUNT: USD 1,375,000.00
MATURITY DATE: 08/04/03
TENOR: 718 days +
Libor + 1.75% p.a.
☑ Matching Libor for this draft + margin
DAYS OF GRACE: 4 DAYS
⊙ Yes
○ No Buyer Requests/Requires modifications to existing documents Seller will deliver modifications to the existing documents:

| | Document | Modifications | Responses |
|---|---|---|---|
| 08. | Verification from the Negotiating Bank that Exporter's signature(s) appearing on documentation is/are authentic and the signatory(s) is/are authorised to sign (singly/jointly) on behalf of the Exporter | Require | ⊙ Yes<br>○ No |
| | Using form and content downloaded from GTFNet's Website?<br>*GTFNet Standard Document | Require | ⊙ Yes<br>○ No |
| | Seller will deliver the additional documents: | | |
| | Additional Documents | | |
| 14a. | Telex from the L/C Issuing Bank acknowledging their acceptance of the assignment of the claim(s) | Require | ○ Yes<br>○ No<br>⊙ Best |

-continued

| | Document | Modifications | Responses |
|---|---|---|---|
| | by the First Purchaser being the Second Seller and their obligation to pay irrevocably the Buyer (being the Second Purchaser) | | Efforts |
| 14b. | A Certified True (Conformed) Copy of a Telex Acceptance of the Bill(s) of Exchange and delivery of a Certified True Copy to the Second Purchaser | Require | ○ Yes<br>○ No<br>⊙ Best Efforts |
| 15a. | In the event that the L/C Issuing Bank should refuse to change the payment route established under the L/C, the Negotiating Bank will issue an irrevocable payment instruction to its correspondent in the country of the currency in which the draft and L/C are denominated | Require | ⊙ Yes<br>○ No<br>○ Best Efforts |
| 15b. | This irrevocable payment instruction will indicate that upon receipt of the funds, the Correspondent Bank must wire the funds directly to the Second Purchaser and not credit the Negotiating Bank's account | Require | ⊙ Yes<br>○ No<br>○ Best Efforts |
| 15c. | Seller will deliver a Certified True (Conformed) Copy of this instruction to the Buyer (being the Second Purchaser) | Require | ⊙ Yes<br>○ No<br>○ Best Efforts |
| | Buyer requires SAFE Approval | Require | ⊙ Yes<br>○ No |

[Reset] [Enter Password] [Submit]

L/C ISSUING BANK    Bank of China       Latest News
L/C/AMOUNT          USD 5,500,000.00    Credit Information
MAXIMUM TENOR       720 days            Enhancement Tools
<View Terms>
<View Complete Offer>
<View Seller's Documents>

Documentation Under Legal Counsel Review

+Apr. 20, 2001 was utilized as the calculation date in this transaction

The buyer then makes a second counteroffer 58 as set out below. In this example this second offer is reflecting the terms of the seller's second offer with no deviation, so it is the buyer making a counter offer based on the seller's revised terms of offer. Nevertheless the negotiation process could have gone on for as many rounds as the counter parties would have needed to settle the terms.

Buyer's Active Counteroffers: Asset #1

Secondary: BUY: Buyer's Active Counteroffers: Asset #1: Second Counteroffer

Disclaimer: The names and identities of counterparties and transactions utilized in the sample transaction are in no way similar to or representative of actual transactions or counterparties and are for demonstration purposes

| Transaction History | | |
|---|---|---|
| Seller Handle: "Harvy3" | Seller's Offer | |
| Buyer Handle: "Joes9" | Buyer's Counteroffer | |
| | Seller's Second Offer | |
| | >>Buyer's Second Counteroffer | |
| L/C ISSUING BANK | Bank of China | Latest News |
| L/C/AMOUNT | USD 5,500,000.00 | Credit Information |
| MAXIMUM TENOR | 720 days | Enhancement Tools |
| <View Terms> | | |
| <View Complete Offer with up-to-date modifications highlighted> | | |
| <View Seller's Documents> | | |

Acceptance of Second Offer

Calculator

1. Buyer accepts the Seller's Second offer with no request for change in terms and awaits receipt of the offer confirmation from the Seller that incorporates the following revised terms:

Number of Drafts: Buyer will purchase [2] Drafts of 4 Drafts

2. Buyer counter offer revised terms restated:

| DRAFT: | Buyer Responses | |
|---|---|---|
| | ⊙ Yes | DRAFT NO. 03: |
| | | AMOUNT: USD 1,375,000.00 |
| | | MATURITY DATE: 10/10/02 |
| | | TENOR: 538 days + |
| | | Libor + 1.675% p.a. |
| | | Matching Libor for this draft + margins |
| | ⊙ Yes | DRAFT NO. 04: |
| | | AMOUNT: USD 1,375,000.00 |
| | | MATURITY DATE: 08/04/03 |
| | | TENOR: 718 days + |
| | | Libor + 1.75% p.a. |
| | | Matching Libor for this draft + margins |
| DAYS OF GRACE: | ⊙ Yes | 4 DAYS |

Buyer Requests/Requires modifications to existing documents Seller will deliver modifications to the existing documents:

| | Document | Modifications | Responses |
|---|---|---|---|
| 08. | Verification from the Negotiating Bank that Exporter's signature(s) appearing on documentation is/are authentic and the signatory(s) is/are authorised to sign (singly/jointly) on behalf of the Exporter | Require | ⊙ Yes |
| | Using form and content downloaded from GTFNet's Website? *GTFNet Standard Document | Require | ⊙ Yes |
| | Seller will deliver the additional documents: Additional Documents | | |
| 14a. | Telex from the L/C Issuing Bank acknowledging their acceptance of the assignment of the claim by the First Purchaser being the Second Seller and their obligation to pay irrevocably the Buyer (being the Second Purchaser) | Require | ⊙ Best Efforts |
| 14b. | A Certified True (Conformed) Copy of a Telex Acceptance of the Bill(s) of Exchange and delivery of a Certified True Copy to the Second Purchaser | | |
| 15a. | In the event that the L/C Issuing Bank should refuse to change the payment route established under the L/C, the Negotiating Bank will issue an irrevocable payment instruction to its correspondent in the country of the currency in which the draft and L/C are denominated | Require | ⊙ Yes |
| 15b. | This irrevocable payment instruction will indicate that upon receipt of the funds, the Correspondent Bank must wire the funds directly to the Second Purchaser and not credit the Negotiating Bank's account | Require | ⊙ Yes |
| 15c. | Seller will deliver a Certified True (Conformed) Copy of this instruction to the Buyer (being the Second Purchaser) | Require | ⊙ Yes |
| | Buyer requires SAFE Approval | Require | ⊙ Yes |

| L/C ISSUING BANK | Bank of China | Latest News |
|---|---|---|
| L/C/AMOUNT | USD 5,500,000.00 | Credit Information |
| MAXIMUM TENOR | 720 days | Enhancement Tools |

<View Terms>

<View Complete Offer with up-to-date modifications highlighted>

<View Seller's Documents>

Documentation Under Legal Counsel Review

The seller then accepts the terms in the second counteroffer 58, and confirms the sale 59 on the following document:

Seller's Confirmation(s) of Sale/Purchase Match(s)

Secondary: SELL: Seller's Confirmation(s) of Sale/Purchase Match(s)

Disclaimer: The names and identities of counterparties and transactions utilized in the sample transaction are in no way similar to or representative of actual transactions or counterparties and are for demonstration purposes only.

| Transaction History | |
|---|---|
| Seller Handle: "Harvy3" | Seller's Offer |
| Buyer Handle: "Joes9" | Buyer's Counteroffer |
| | Seller's Second Offer |
| | Buyer's Second Counteroffer |
| | >>Seller's Confirmation |

Seller's confirmation of Sale/Purchase offer with revised terms We, the first purchaser, "Harvy3" confirm the terms and conditions of our sale/your purchase of the payment claims under letter of credit described:

| Referenced Transaction: | Without recourse financing—China |
|---|---|
| Seller ref: | harvy3 |
| Buyer ref: | joes9 |
| Sale from: | The First Purchaser/Second Seller |

-continued

| | |
|---|---|
| Sale to: | The Second Purchaser |
| ASSET: | USD 2,750,000.00 evidenced by two (2) Bills of Exchange accepted by the Bank of China, Shanghai Branch, China (China) |
| L/C ISSUING BANK (obligor): | Bank of China    Latest News Credit Information |
| BRANCH: | Shanghai, China    Enhancement Tools |
| Country: | China |
| Total L/C AMOUNT: | USD 5,500,000.00 |
| CURRENCY: | US Dollars |
| Underlying GOODS | Textile Equipment |
| MAXIMUM TENOR—720 days | AFTER BILL OF LADING |
| Tenor remaining | 718 days + |
| Total NO. OF BILL(S) OF EXCHANGE | 2 (only) |
| REPAYMENT | SEMIANNUAL |
| Payment Domicile: | Bank of China, Shanghai Branch, China |
| Total face amount of drafts: | USD 2,750,000.00 |
| DRAFT: | NO. 3 |
| Face AMOUNT: | USD 1,375,000.00 |
| MATURITY DATE: | 10/10/2002 |
| TENOR: | 540 days + |
| DRAFT: | NO. 4 |
| AMOUNT: | USD 1,375,000.00 |
| MATURITY DATE: | 08/04/2003 |
| TENOR: | 720 days + |
| Negotiating Bank: | To be advised |
| Exporter: | To be advised |
| Importer: | To be advised |
| Reference Calendar for calculation: | UK |
| Libor rate: | fixed at 11:00 AM London two business days before the disbursement of funds |
| Discount rate: | Discount to Yield compounded semi-annually |
| Draft No. 3 | Matching Libor plus 1.675 pct. p.a. DTY |
| Draft No. 4 | Matching Libor plus 1.75 pct. p.a. DTY |
| INTEREST BASIS: | 365 DAYS OVER 360 DAYS |
| DAYS OF GRACE | 4 |
| DAYS OF GRACE: | |

Due to trade finance practitioners' historical experience of delays in repayments and settlement procedures with certain counties and/or guaranteeing banks, the practice of anticipating these delays and factoring them into the discounting developed and these days are known as "days of grace". They are added to the final maturity and thereby discounted in advance whether actual or not.

| | |
|---|---|
| PROCEEDS: | USD 2,472,894.80 |
| Offer Expiry: | One month from date of Buyer's confirmation issuance. |

Evidenced by:
DOCUMENTATION (1) Certified True (Conformed) Copy of L/C issued together with all amendments (2) Certified True (Conformed) Copy of a tested telex/SWIFT message from the L/C Issuing Bank to the Negotiating Bank confirming that the documents are in full compliance with the L/C terms and that USD 1,375,000.00 (amount) is due on Oct. 10, 2002 (dd/mm/yyyy) and USD 1,375,000.00 (amount) is due on Aug. 4, 2003 (dd/mm/yyyy).

(3) Confirmation from you, the Negotiating Bank, that the documents fully comply with the L/C terms and that USD 1,375,000.00 (amount) is due on Oct. 10, 2002 (dd/mm/yyyy) USD 1,375,000.00 (amount) is due on Aug. 4, 2003 (dd/mm/yyyy).

(4)(a) Certified True (Conformed) Copy(s) of the Bill(s) of Lading evidencing shipment (by the Negotiating Bank).

(5)(a) Certified True (Conformed) Copy of Commercial Invoice(s) (by the Negotiating Bank).

(5)(b) Certified True (Conformed) Copy of the Letter of Assignment of proceeds under the L/C to the First Purchaser, being the Seller signed by the Exporter and addressed to Negotiating Bank, being the First Purchaser and Seller in this transaction [with form and content downloaded from GTF-Net's Website.]

"GTFNet Standard Document"

(5)(c) Certified True (Conformed) Copy of the Letter of Assignment of proceeds under the commercial invoice to the First Purchaser (Seller) signed by the Exporter addressed to the First Purchaser i.e. Seller (being the Negotiating Bank) [with form and content downloaded from GTFNet's Website.]

"GTFNet Standard Document"

(6) Certified True (Conformed) Copy of the Telex Acceptance of the Bill(s) of Exchange in lieu of original Bills of Exchange [with form and content downloaded from GTFNet's Website.]

"GTFNet Standard Document"

Telex Acceptance of the Bills of Exchange:

"the Certified True (Conformed) Copy(s) of a tested telex/SWIFT message from the L/C Issuing Bank to the Negotiating Bank stating that the L/C Issuing Bank has accepted the Bill(s) of Exchange, confirming the amount USD 1,375,000.00 (amount) due on Oct. 10, 2002 (ddlmm/yyyy) and USD 1,375,000.00 (amount) due on 08/04/2003 (dd/mm/yyyy) and that the bank will under no circumstances release the Bill(s) of Exchange to any other party, person or institution other than the Exporter and or its assignee(s) and undertakes to pay upon presentation in effective currency at maturity the referenced amounts, without any deductions whatsoever, to the Exporter and or its assignee(s).

(7) Verification from the Negotiating Bank that the Exporter's signature(s) appearing on documentation is/are authentic and the signatory(s) is/are authorised to sign (singly/jointly) on behalf of the Exporter [with form and content downloaded from GTFNet's Website.]

"GTFNet Standard Document"

(8) Certified True (Conformed) Copy(s) made by the Negotiating Bank, being the Seller of its Current list of authorised signatories.

"GTFNet Standard Document"

(9) Certified True (Conformed) Copy of the letter of notification from exporter to the L/C Issuing Bank in which the Exporter notifies the L/C Issuing Bank of the assignment of the proceeds to the First Purchaser, being the Negotiating Bank and the Seller, [with form and content identical to that scanned and submitted with the original Seller's offer.]

"GTFNet Standard Document"

(10) Certified True (Conformed) Copy of tested telex/SWIFT message, [with form and content downloaded from GTFNet's Website,] from the L/C Issuing Bank acknowledging the assignment of proceeds in favour of First Purchaser (Seller) and undertaking to pay the First Purchaser upon presentation in effective currency at maturity the referenced amounts, without any deductions whatsoever.

"GTFNet Standard Document"

(11) Certified True (Conformed) Copy of the notification from the Seller to L/C Issuing Bank that the Seller has assigned the claim(s) to the Buyer (Second Purchaser), [with form and content downloaded from GTFNet's "GTFNet Standard Document"

(12) Certified True (Conformed) Copy of the tested telex/SWIFT message, [with form and content downloaded from GTFNet's Website,] from the LC Issuing Bank acknowledging the assignment of the claim(s) in favour of the Buyer, being the Second Purchaser and undertaking irrevocably to pay the Buyer, being the Second Purchaser, upon presentation in effective currency at maturity the referenced amounts, without any deductions whatsoever. The Seller will on a best efforts basis obtain the telex/SWFT message with the content for this telex/SWIFT message downloaded from GTFNet's Website.

"GTFNet Standard Document"

(13) In the event that the L/C Issuing Bank should refuse to change the payment route established under the L/C [Item (12) hereinabove], the Negotiating Bank will issue an irrevocable payment instruction to its correspondent in the country of the currency in which the Draft and L/C are denominated. This irrevocable payment instruction WILL indicate that upon receipt of the funds, the Correspondent Bank must wire the funds directly to the Second Purchaser and not credit the Negotiating Bank's account. A Certified True (Conformed) Copy of this instruction will be delivered to the Buyer (being the Second Purchaser) [with form and content downloaded from GTFNet's Website or in any case acceptable to the Second "GTFNet Standard Document"

(14) Signed Purchase Contract between the Second Seller, being the First Purchaser, and the Buyer, the Second Purchaser, [with form and content downloaded from GTFNet's Website.]

"GTFNet Standard Document"

(15) The Option for custodian services is retained by both the Buyer and Seller.

The Seller:
Agreed and Accepted by

The Buyer
(Digital Signature - proposed technology - Identrus, Entrust, Verisign depending on relevant jurisdiction e.g. Entrust for Singapore)

<View Seller's Documents>

Documentation Under Legal Counsel Review

+Apr. 20, 2001 was utilized as the calculation date in this transaction

Then the buyer confirms the sale 60 with the following document:

Buyer's Confirmation(s) of Sale/Purchase Match(s)

Secondary: BUY: Buyer's Confirmation(s) of Sale/Purchase Match(s)

Disclaimer: The names and identities of counterparties and transactions utilized in the sample transaction are in no way similar to or representative of actual transactions or counterparties and are for demonstration purposes only.

| | Transaction History |
|---|---|
| Seller Handle: "Harvy3" | Seller's Offer |
| Buyer Handle: "Joes9" | Buyer's Counteroffer |
| | Seller's Second Offer |
| | Buyer's Second Counteroffer |
| | Seller's Confirmation |
| | >>Buyer's Confirmation |

Buyer's confirmation of Sale/Purchase offer with revised terms Buyer Handle: "Joes9" confirmation of purchaser to Seller, Handle: "Harvy3". This confirmation sets forth the terms and conditions of your, Harvy3's sale/our, Joes9's purchase of the following transaction subject to the original documentation being acceptable to us in form and substance and set forth below:

| | | |
|---|---|---|
| Referenced Transaction: | Without recourse financing—China | |
| Buyer ref: | joes9 | |
| Seller ref: | harvy3 | |
| Sale from: | The First Purchaser/Second Seller | |
| Sale to: | The Second Purchaser | |
| ASSET: | USD 2,750,000.00 evidenced by two (2) Bills of Exchange accepted by the Bank of China, Shanghai Branch, China (China) | |
| L/C ISSUING BANK (obligor): | Bank of China | Latest News Credit Information |
| BRANCH: | Shanghai, China | Enhancement Tools |
| Country: | China | |
| Total L/C AMOUNT: | USD 5,500,000.00 | |
| CURRENCY: | US Dollars | |
| Underlying GOODS | Textile Equipment | |
| MAXIMUM TENOR—720 days | AFTER BILL OF LADING | |
| Tenor remaining | 718 days + | |
| Total NO. OF BILL(S) OF EXCHANGE | 2 (only) | |
| REPAYMENT | SEMIANNUAL | |
| Payment Domicile: | Bank of China, Shanghai Branch, China | |
| Total face amount of drafts: | USD 2,750,000.00 | |
| DRAFT: | NO. 3 | |
| Face AMOUNT: | USD 1,375,000.00 | |
| MATURITY DATE: | 10/10/2002 | |
| TENOR: | 540 days + | |
| DRAFT: | NO. 4 | |
| AMOUNT: | USD 1,375,000.00 | |
| MATURITY DATE: | 08/04/2003 | |
| TENOR: | 720 days + | |
| Negotiating Bank: | To be advised | |
| Exporter: | To be advised | |
| Importer: | To be advised | |
| Reference Calendar for | UK | |

-continued

| | |
|---|---|
| calculation: | |
| Libor rate: | Fixed at 11:00 AM London two business days before the disbursement of funds |
| Discount rate: | Discount to Yield compounded semi-annually |
| Draft No. 3 | Matching Libor plus 1.675 pct. p.a. DTY |
| Draft No. 4 | Matching Libor plus 1.75 pct. p.a. DTY |
| INTEREST BASIS: | 365 DAYS OVER 360 DAYS |
| DAYS OF GRACE | 4 |
| DAYS OF GRACE: | |

Due to trade finance practitioners' historical experience of delays in repayments and settlement procedures with certain countries and/or guaranteeing banks, the practice of anticipating these delays and factoring them into the discounting developed and these days are known as "days of grace". They are added to the final maturity and thereby discounted in advance whether actual or not.

| | |
|---|---|
| PROCEEDS: | USD 2,472,894.80 |
| Offer Expiry: | One month from date of Buyer's confirmation issuance. |
| Evidenced by: | |
| DOCUMENTATION | |

(1) Certified True (Conformed) Copy of L/C issued together with all amendments (2) Certified True (Conformed) Copy of a tested telex/SWIFT message from the L/C Issuing Bank to the Negotiating Bank confirming that the documents are in full compliance with the L/C terms and that USD 1,375,000.00 (amount) is due on Oct. 10, 2002 (dd/mm/yyyy) and USD 1,375,000.00 (amount) is due on Aug. 4, 2003 (dd/mm/yyyy).

(3) Confirmation from you, the Negotiating Bank, that the documents fully comply with the L/C terms and that USD 1,375,000.00 (amount) is due on Oct. 10, 2002 (dd/nm/yyyy) USD 1,375,000.00 (amount) is due on Aug. 4, 2003 (dd/mm/yyyy).

(4)(a) Certified True (Conformed) Copy(s) of the Bill(s) of Lading evidencing shipment (by the Negotiating Bank).

(5) Certified True (Conformed) Copy of Commercial Invoice(s) (by the Negotiating Bank).

(5)(a) Certified True (Conformed) Copy of the Letter of Assignment of proceeds under the L/C to the First Purchaser, being the Seller signed by the Exporter and addressed to Negotiating Bank, being the First Purchaser and Seller in this transaction [with form and content downloaded from GTFNet's Website.]

"GTFNet Standard Document"

(5)(b) Certified True (Conformed) Copy of the Letter of Assignment of proceeds under the commercial invoice to the First Purchaser (Seller) signed by the Exporter addressed to the First Purchaser i.e. Seller (being the Negotiating Bank) [with form and content downloaded from GTFNet's Website.]

"GTFNet Standard Document"

(6) Certified True (Conformed) Copy of the Telex Acceptance of the Bill(s) of Exchange in lieu of original Bills of Exchange [with form and content downloaded from GTFNet's Website.]

"GTFNet Standard Document"

Telex Acceptance of the Bills of Exchange:

"the Certified True (Conformed) Copy(s) of a tested telex/SWIFT message from the L/C Issuing Bank to the Negotiating Bank stating that the L/C Issuing Bank has accepted the Bill(s) of Exchange, confirming the amount USD 1,375,000.00 (amount) due on 10/10/2002 (dd/mmlyyyy) and USD 1,375,000.00 (amount) due on 08/04/2003 (dd/mm/my) and that the bank will under no circumstances release the Bill(s) of Exchange to any other party, person or institution other than the Exporter and or its assignee(s) and undertakes to pay upon presentation in effective currency at maturity the referenced amounts, without any deductions whatsoever, to the Exporter and or its assignee(s).

(7) Verification from the Negotiating Bank that the Exporter's signature(s) appearing on documentation is/are authentic and the signatory(s) is/are authorised to sign (singly/jointly) on behalf of the Exporter [with form and content downloaded from GTFNetrs Website.]

"GTFNet Standard Document"

(8) Certified True (Conformed) Copy(s) made by the Negotiating Bank, being the Seller of its Current list of authorised signatories.

"GTFNet Standard Document"

(9) Certified True (Conformed) Copy of the letter of notification from Exporter to the L/C Issuing Bank in which the Exporter notifies the L/C Issuing Bank of the assignment of the proceeds to the First Purchaser, being the Negotiating Bank and the Seller, [with form and content identical to that scanned and submitted with the original Seller's offer.]

"GTFNet Standard Document"

(10) Certified True (Conformed) Copy of tested telex/SWIFT message, [with form and content downloaded from GTFNet's Website,] from the L/C Issuing Bank acknowledging the assignment of proceeds in favour of First Purchaser (Seller) and undertaking to pay the First Purchaser upon presentation in effective currency at maturity the referenced amounts, without any deductions whatsoever.

"GTFNet Standard Document"

(11) Certified True (Conformed) Copy of the notification from the Seller to L/C Issuing Bank that the Seller has assigned the claim(s) to the Buyer (Second Purchaser), [with form and content downloaded from GTFNet's "GTFNet Standard Document"

(12) Certified True (Conformed) Copy of the tested telex/SWIFT message, [with form and content downloaded from GTFNet's Website,] from the L/C Issuing Bank acknowledging the assignment of the claim(s) in favour of the Buyer, being the Second Purchaser and undertaking irrevocably to pay the Buyer, being the Second Purchaser, upon presentation in effective currency at maturity the referenced amounts, without any deductions whatsoever. The Seller will on a best efforts basis obtain the telex/SWIFT message with the content for this telex/SWIFT message downloaded from GTFNet's Website.

"GTFNet Standard Document"

(13) In the event that the L/C Issuing Bank should refuse to change the payment route established under the L/C [Item (12) hereinabove], the Negotiating Bank will issue an irrevocable payment instruction to its correspondent in the country of the currency in which the Draft and L/C are denominated. This irrevocable payment instruction WILL indicate that upon receipt of the funds, the Correspondent Bank must wire the funds directly to the Second Purchaser and not credit the Negotiating Bank's account. A Certified True (Conformed) Copy of this instruction will be delivered to the Buyer (being the Second Purchaser) [with form and content downloaded from GTFNet's Website or in any case acceptable to the Second "GtFNet Standard Document"

(14) Signed Purchase Contract between the Second Seller, being the First Purchaser, and the Buyer, the Second Purchaser, [with form and content downloaded from GTFNet's Website.]

"GTFNet Standard Document"

(15) The Option for custodian services is retained by both the Buyer and Seller.

This Sale/Purchase MATCH is subject to the presentation of original documents by the Seller that are identical in form and content to the scanned documentation presented in the Seller's offer to the Buyer, excluding documents on which changes have been specifically requested by the Buyer, and that are acceptable to the Buyer in form and substance. The validity, construction and enforceability of this Sale/Purchase MATCH shall be governed by the laws of the United Kingdom without giving effect to any conflict in laws principles thereof. Both the Seller and Buyer, being the Second Purchaser, agree to irrevocably submit to the non-exclusive jurisdiction of the courts sitting in the United Kingdom in any action to enforce the provisions of the Sale/Purchase MATCH and to waive any defence of forum non-convenience in any proceeding commenced in the United Kingdom in relation to this Sale/Purchase MATCH.

---

The Buyer:

Agreed and Accepted by

☐

The Seller
(Digital Signature - proposed technology - Identrus, Entrust, Verisign depending on relevant jurisdiction e.g. Entrust for Singapore)

---

<View Seller's Documents>

Documentation Under Legal Counsel Review

+Apr. 20, 2001 was Utilized as the Calculation Date in this Transaction

The parties then agree to the terms of the sale subject to verification of hard copy documents being in accordance with the scanned or faxed documents and authenticity accepted. After confirmation of payment obligations the system discloses the counter parties identities to each other on the following identity disclosure document:

Identity Disclosure Document

Secondary: Documents & Procedures: Identity Disclosure Document

Disclaimer: The names and identities of counterparties and transactions utilized in the sample transaction are in no way similar to or representative of actual transactions or counterparties and are for demonstration purposes only.

Latest News

This page is generated by Global Trade Finance Network™ ("GFTNet") System, and is confirmation by Seller and Credit Information Buyer of a complete Sale/Purchase MATCH.

GTFNet hereby notifies the Seller and the Buyer that (a) upon the signing of this confirmation by the Seller and the Buyer, (b) the counterparties' names shall be disclosed to each other and a counterparty evaluation period shall commence.

At the expiry of such counterparty evaluation period, which is Identity Disclosure date (dd/mm/yyyy)++24 hours (GMT), GTFNet's Sale/Purchase MATCH is consummated and fee will be due and payable.

The validity, construction and enforceability of this Sale/Purchase MATCH shall be governed by the laws of the United Kingdom without giving effect to any conflict in laws principles thereof. The Seller, Buyer, and GTFNet agree to irrevocably submit to the non-exclusive jurisdiction of the courts sitting in the United Kingdom in any action to enforce the provisions of the MATCH and to waive any defence of forum non-convenience in any proceeding commenced in the United Kingdom in relation to this Sale/Purchase MATCH.

Buyer States Hereby in Writing:

"We (the Buyer) confirm our Purchase as per GTFNet's document "Buyer's Confirmation of the Sale/Purchase MATCH" of the sale offer by the Seller as per GTFNet's document "Seller's Confirmation of the Sale/Purchase MATCH".

We, the Buyer, accept the documents subject only to the presentation and inspection of original documents from the Seller, that they are identical in form and content to the scanned documents presented in the Seller's offer to the Buyer, excluding documents on which changes have been specifically requested by the Buyer, and that they are acceptable in substance.

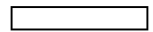

Digital Signature (proposed technology depending upon jurisdiction—Identrus, Verisign, Entrust)

And

Seller States Hereby in Writing:

"We (the Seller) accept the Buyer's confirmation of Purchase as per GTFNet's document "Buyer's Confirmation of the Sale/Purchase MATCH" of our sale offer as per GTFNet document "Seller's Confirmation of the Sale/Purchase MATCH".

We, the Seller, will deliver the original documents defined and described in the abovereferred GTFNet's documents, being the Seller's offer and the Buyer's confirmation of purchase respectively. We understand this sale is subject only to the inspection of original documents by the Buyer, that the documents are identical in form and content to the scanned documents presented in the Seller's offer to the Buyer, excluding documents on which changes have been specifically requested by the Buyer, and that are acceptable to the Buyer in form and substance.

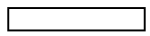

Digital Signature (proposed technology depending upon jurisdiction—Identrus, Verisign, Entrust)

| The counterparty names are disclosed to each other as follows: | |
|---|---|
| "Middle Eastern Regional Bank Ltd" (Seller)(Harvy3) | Latest News Credit Information |
| "The UK Bank Ltd" (Buyer)(Joes9) | Latest News Credit Information |

The Buyer's "counterparty evaluation period" has commenced. The Buyer has herewith the right to notify Seller Handle Harvy3 no later than Identity Disclosure date (dd/mm/yyyy)++24 hours (GMfT) in the event the Buyer does not wish to proceed with the transaction due exclusively and singularly to the unacceptability of Seller Handle "Harvy3" as a counterparty. If the Buyer Handle "Joes9" has not sent a message before Identity Disclosure date (dd/mm/yyyy)++24 hours (GMT) then GTFNet's Sale/Purchase MATCH will have been concluded and transaction fee due and payable. Documents described in aforesaid drafts will be delivered by Seller Handle "Harvy3" to Buyer Handle "Joes9" against payment.

| Acceptance or Rejection of the Option for Custodian services | | |
|---|---|---|
| Buyer—Requires settlement via custodian | ○ yes | ⊙ no |
| Seller—Requires settlement via custodian | ○ yes | ⊙ no |

The custodian for Seller Handle Harvy3 and Buyer Handle Joes9 is

[Name of Custodian]/None.

Acceptance or Rejection of the Option for Escrow services

| Buyer—Requires settlement via escrow | ○ yes | ⊙ no |
|---|---|---|
| Seller—Requires settlement via escrow | ○ yes | ⊙ no |

The escrow for Seller Handle Harvy3 and Buyer Handle Joes9 is

[Name of Escrow]/None.

| Referenced Transaction: Without recourse financing—China | |
|---|---|
| Buyer ref: | joes9 |
| Seller ref: | harvy3 |
| Sale from: | The First Purchaser/Second Seller |

| -continued | |
|---|---|
| Referenced Transaction: Without recourse financing—China | |
| Purchase by: | The Second Purchaser |
| ASSET: | USD 2,750,000.00 evidenced by two (2) Bills of Exchange accepted by the Bank of China, Shanghai Branch, China (China) |
| Total face amount of drafts | USD 2,750,000.00 |

DRAFT NO. 3:

AMOUNT: 1,375,000.00

MATURITY DATE: Oct. 10, 2002

TENOR: 540 days+

DRAFT NO. 4:

AMOUNT: 1,375,000.00

MATURITY DATE: Aug. 4, 2003

TENOR: 720 days+

If the Buyer Handle Joes9 has not sent a message before 0900 hrs GMT on (dd/mm/yyyy) GTFNet will notify Buyer and Seller that documents can be delivered for closing and settlement along with counterparty contact detail information is provided.

The system generates a Transaction number ### cbabs0101

Transaction cbabs0101 Fee Payment (Message generated by GTFNet system and Send to Buyer at the expiry of the Counterparty Evaluation Period)

Buyer Handle Joes9 "The UK Bank Ltd", London UK undertakes to pay a sum of USD xxxx being yyyy pct. p.a. of the draft amounts to Global Trade Finance Network™ Ltd promptly upon presentation of an invoice in this amount by Global Trade Finance Network™ Ltd and in any case no later than (date, 30 days after calculation date)+by wire transfer to (Name of correspondent in USD/effective currency) for further credit to the account of (Name of GTFNet's Bank) for credit to account number . . . of GTFNet.

In the event the Buyer Handle Joes9 "The UK Bank Ltd", London UK has chosen not to proceed with the transaction, Buyer Handle Joes9 "The UK Bank Ltd", London UK undertakes to pay a sum of USD zzzz being the administrative fee to Global Trade Finance Network™ Ltd by remitting the same by wire transfer to (Name of correspondent in USD/effective currency) for further credit to the account of (Name of GTFNet's Bank) for credit to account number . . . of GTFNet promptly upon presentation of an invoice in this amount by Global Trade Finance Network™ Ltd and in any case no later than (date, 30 days after calculation date)+.

Acknowledged and Agreed

The Buyer

Digital Signature (proposed technology depending upon jurisdiction—Identrus, Verisign, Entrust)

Reset  Submit

Documentation Under Legal Counsel Review
+Apr. 20, 2001 was utilized as the calculation date in this transaction After disclosure of the identities the counter parties can choose options for escrow services and/or warehouse services. Although the invention has been described with reference to one particular transaction structure and by way of one example, it should be appreciated that it may be implemented for many trade (debt) receivable transaction structures and in many other ways.

Although the counter parties may trade anonymously extensive information can be known about each counter party by the other, particularly financial information such as credit ratings, amount of capital may be made available via the exchange.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

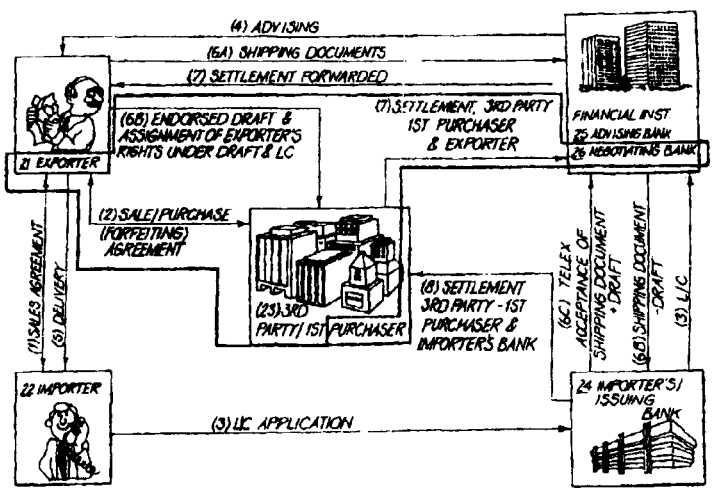

The invention claimed is:

1. A method of operating a computerized forfaiting exchange to develop forfaiting transactions for settlement, comprising the following steps:
   a. providing access to the computerized forfaiting exchange to sellers and buyers;
   b. providing a counter party selection document on request to a seller or buyer to view via the computerized forfaiting exchange, where the counter Party selection document contains classes of counter parties together with counter party selection entry facilities;
   c. permitting a seller to identify classes of buyers with whom they will, or will not, develop a forfaiting transaction, by entering selections on the counter party selection document using the counter party selection entry facilities;
   d. providing an offer document on request to a seller to view via the computerized forfaiting exchange, where the offer document includes the following items:
      i. classes of assets together with asset selection entry facilities and asset information entry facilities for entry of details of an asset related to the forfaiting transaction, the asset information comprising details on at least one payment obligation,
      ii. terms for the offer together with offer selection entry facilities and information entry facilities for entry of details of the offer,
      iii. offer documents to accompany the offer together with offer document selection entry facilities and offer document attachment facilities for attaching copies of offer documents, and
      iv. undertakings for the seller to make in connection with the forfaiting transaction together with undertaking selection entry facilities and undertaking document attachment facilities for attaching copies of undertaking documents,
   e. permitting the seller to create an instance of the offer document, by:
      i. identifying the asset to be offered by using the asset selection entry facilities and asset information entry facilities,
      ii. identifying the terms for the offer by using the offer selection entry facilities and offer information entry facilities,
      iii. identifying the offer documents to accompany the offer by using the offer document selection entry facilities and offer document attachment facilities, and
      iv. identifying the undertakings to be made by using the undertaking selection entry facilities and undertaking document attachment facilities;
   f. permitting the seller to submit an instance of the offer document, so that it becomes available to view by potential buyers from only the classes of buyers identified as being those whom the seller will develop the transaction;
   g. providing a counter offer document on request to a buyer after the buyer has viewed the offer document, where the counter offer document contains counter offer selection and counter offer information entry facilities for entry of variations; and
   h. permitting the buyer to create an instance of the counter offer document by entering selections and information using the counter offer selection and information entry facilities, and to submit the counter offer instance, so that it becomes available to the seller.

2. A method according to claim 1, comprising the further steps of providing a further counter offer document on request to the seller or buyer, the further counter offer document comprising counter offer selection and counter offer information entry facilities for entry of variations, and permitting the seller or buyer to create an instance of the further counter offer document by entering selections and information using the counter offer selection and information entry facilities, and to submit the further counter offer instance, so that it becomes available to the counter party.

3. A method according to claim 1, comprising the further step of providing access to documents via the computerized forfaiting exchange, where the documents comprise electronic links to independent sources of financial information.

4. A method according to claim 1, comprising the further step of providing access to documents via the computerized forfaiting exchange, where the documents comprise electronic links to standardized forms of documents, such as asset defining documents used to support instances of the offer document.

5. A method according to claim 1, comprising the further step of providing access to documents via the computerized forfaiting exchange, where the documents comprise electronic links to standardized forms of undertaking documents.

6. A method according to claim 1, comprising the further step of providing assistance for completing the process.

7. A method according to claim 1, comprising the further step of providing an asset screening document for use by potential buyers to select the types of asset they wish to view, and not view.

8. A method according to claim 1, where the payment obligation is supported by at least one of draft(s)/bill(s) of exchange drawn under deferred payment letter of credit(s), site letter of credit requiring confirmation, down payment on export credit agency (ECA) transaction structured for deferred payment, naked deferred payment claim, deferred payment claim with credit enhancement, and deferred payment claim with financial guarantee.

9. A method according to claim 1, where the step of providing access to the computerized forfaiting exchange comprises providing web site access via the Internet to seller and buyers.

10. A method according to claim 1, comprising the further step of permitting the identity of the seller, the buyer, or the seller and the buyer to remain anonymous during negotiation of the forfaiting transaction.

11. A method according to claim 10, comprising the further step of disclosing the identity of the seller, the buyer, or the seller and the buyer to each respective counter party when a sale/purchase match is obtained for the forfaiting transaction.

12. A method according to claim 1, comprising the further step of restricting viewing of instances of offer documents by potential buyers, depending upon the selections and entries made by the buyer in the counter party selection document.

13. A computerized forfaiting exchange, comprising:
  a. a site electronically accessible to sellers and buyers;
  b. a database associated with the site and storing:
    i. a counter party selection document, where the counter party selection document includes classes of counter parties together with counter party selection entry facilities;
    ii. an offer document for the forfaiting transaction, where the offer document includes the following items:
      1) classes of assets together with asset selection entry facilities and asset information entry facilities for entry of details of an asset related to the forfaiting transaction, the asset information comprising details on at least one payment obligation,
      2) terms for the offer together with offer selection entry facilities and offer information entry facilities for entry of details of the offer,
      3) offer documents to accompany the offer together with offer document selection entry facilities and offer document attachment facilities for attaching copies of offer documents, and
      4) undertakings for the seller to make in connection with the forfaiting transaction together with undertaking selection entry facilities and undertaking document attachment facilities for attaching copies of undertaking documents; and
    iii. a counter offer document containing counter offer selection and information entry facilities;
  c. a processor associated with the site and the database and operable to retrieve documents from the database to view at the site;
  d. the processor being further operable on request either to permit the entry of selections and information to create instances of documents on-line; and
  e. the processor being further operable to permit viewing of instances of offer documents by potential buyers, depending upon the selections and entries made by the seller in counter party selection document.

14. A computerized forfaiting exchange according to claim 13, further comprising a printing facility operable on request to print an offer document for use off-line.

15. A computerized forfaiting exchange according to claim 13, where the payment obligation is supported by at least one of draft(s)/bill(s) of exchange drawn under deferred payment letter of credit(s), site letter of credit requiring confirmation, down payment on export credit agency (ECA) transaction structured for deferred payment, naked deferred payment claim, deferred payment claim with credit enhancement, and deferred payment claim with financial guarantee.

16. A computerized forfaiting exchange according to claim 13, where the site is a web site that is accessible via the Internet to seller and buyers.

17. A computerized forfaiting exchange according to claim 13, where the processor is further operable to permit the identity of the seller, the buyer, or the seller and the buyer to remain anonymous during negotiation of the forfaiting transaction.

18. A computerized forfaiting exchange according to claim 17, where the processor is further operable to disclose the identity of the seller, the buyer, or the seller and the buyer to each respective counter party when a sale/purchase match is obtained for the forfaiting transaction.

19. A computerized forfaiting exchange according to claim 13, the processor being further operable to permit viewing of instances of offer documents by potential buyers, depending upon the selections and entries made by the buyer in counter party selection document.

20. A computerized forfaiting exchange according to claim 13, the processor being further operable to provide a counter offer document on request to the buyer after the buyer has viewed the offer document, where the counter offer document contains counter offer selection and counter offer information entry facilities for entry of variations, and to permit the buyer to create an instance of the counter offer document by entering selections and information using the counter offer selection and information entry facilities, and to submit the counter offer instance, so that it becomes available to the seller.

21. A computerized forfaiting exchange according to claim 20, the processor being further operable to provide a further counter offer document on request to the seller or buyer, where the further counter offer document contains counter offer selection and counter offer information entry facilities for entry of variations, and to permit the seller or buyer to create an instance of the further counter offer document by entering selections and information using the counter offer selection and information entry facilities, and to submit the further counter offer instance, so that it becomes available to the counter party.

22. A method according to claim 6, wherein the assistance is provided online.

* * * * *

UNITED STATES PATENT AND TRADEMARK OFFICE
CERTIFICATE OF CORRECTION

PATENT NO.        : 7,571,132 B2
APPLICATION NO. : 10/052419
DATED             : August 4, 2009
INVENTOR(S)       : Tara Kimbrell Cole It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2266 days.

Signed and Sealed this

Seventh Day of September, 2010

David J. Kappos
*Director of the United States Patent and Trademark Office*

UNITED STATES PATENT AND TRADEMARK OFFICE
CERTIFICATE OF CORRECTION

PATENT NO.       : 7,571,132 B2                                    Page 1 of 3
APPLICATION NO. : 10/052419
DATED            : August 4, 2009
INVENTOR(S)      : Tara Kimbrell Cole It is certified that error appears in the above-identified patent and that said Letters Patent is hereby corrected as shown below:

The title page showing the illustrative figure should be deleted to be replaced with the attached title page.

The drawing sheet, consisting of Fig. 2, should be deleted to be replaced with the drawing sheet, consisting of Fig. 2, as shown on the attached page.

In Fig. 2:

replace "(4) ADVERTISING" with --(4) ADVISING--; and replace "25 ADVERTISING BANK" with --25 ADVISING BANK--.

Figure 4:
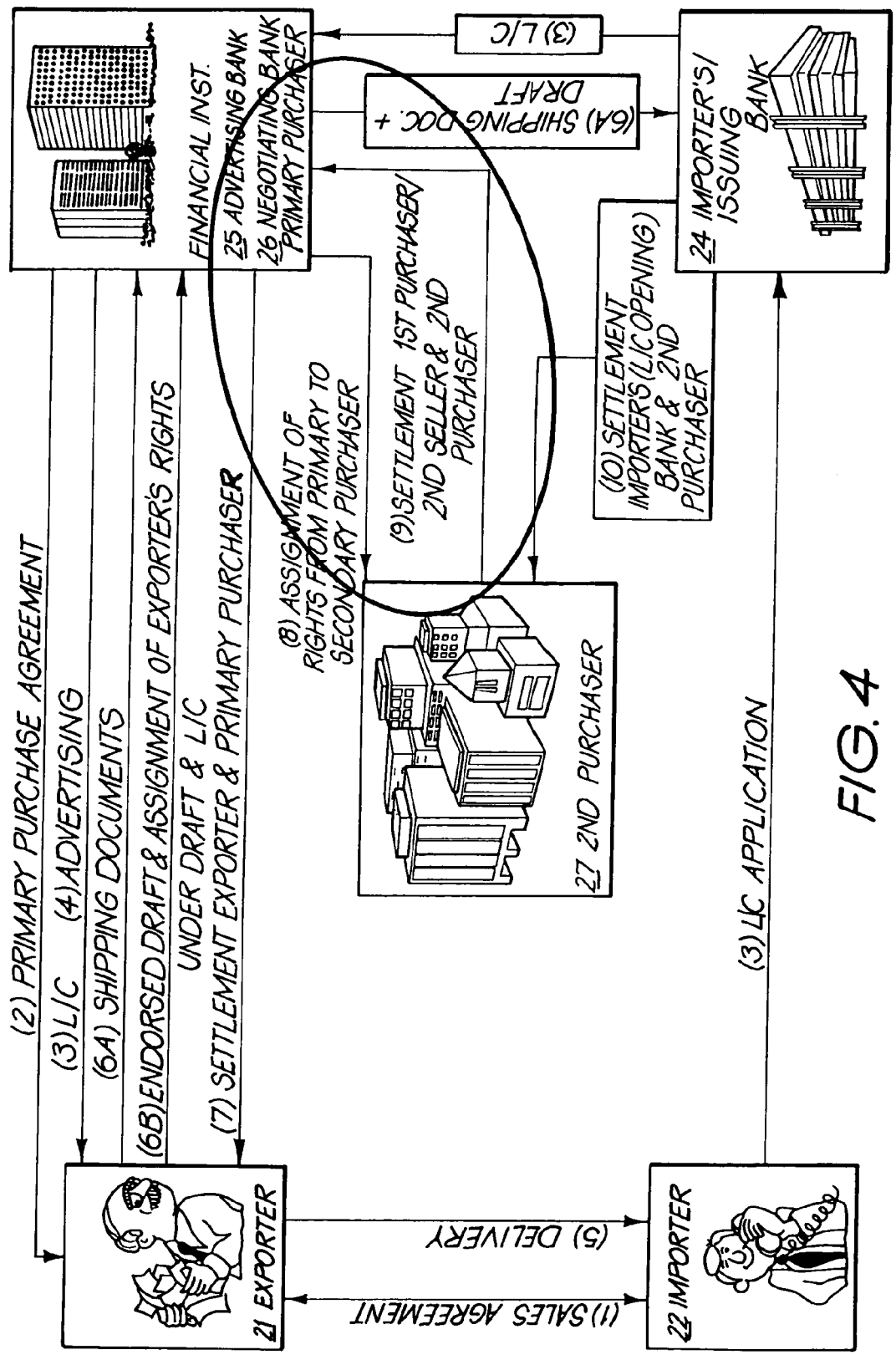
FIG. 4 is a diagram of the underlying parties and the business flows that precede a forfaiting transaction executed via the network using the software on (or and) the 'secondary platform' according to the invention. The portion that is addressed on the web site is encircled for clarification sake.

In Fig. 4:

replace "(4) ADVERTISING" with --(4) ADVISING--; and replace "25 ADVERTISING BANK" with --25 ADVISING BANK--.

Signed and Sealed this

Twenty-third Day of November, 2010

David J. Kappos
*Director of the United States Patent and Trademark Office*

CERTIFICATE OF CORRECTION (continued)

(12) United States Patent
Cole

(10) Patent No.: US 7,571,132 B2
(45) Date of Patent: Aug. 4, 2009

(54) FORFAITING TRANSACTIONS

(75) Inventor: Tara Kimbrell Cole, Singapore (SG)

(73) Assignee: Global Trade Finance Network Pte. Ltd., Singapore (SG)

( * ) Notice: Subject to any disclaimer, the term of this patent is extended or adjusted under 35 U.S.C. 154(b) by 1594 days.

(21) Appl. No.: 10/052,419

(22) Filed: Jan. 18, 2002

(65) Prior Publication Data

US 2003/0140005 A1 Jul. 24, 2003

(30) Foreign Application Priority Data

Dec. 20, 2001 (AU) .................................. PR9695

(51) Int. Cl.
*G06Q 40/00* (2006.01)

(52) U.S. Cl. .............................. 705/37; 705/38; 705/39; 705/40

(58) Field of Classification Search .............. 705/35–40
See application file for complete search history.

(56) References Cited

U.S. PATENT DOCUMENTS

| | | | | |
|---|---|---|---|---|
| 5,717,989 | A * | 2/1998 | Tozzoli et al. | .................. 705/37 |
| 6,629,081 | B1 * | 9/2003 | Cornelius et al. | .............. 705/30 |
| 7,155,409 | B1 * | 12/2006 | Stroh | ........................... 705/37 |
| 2002/0103754 | A1 | 8/2002 | Dunlop | |

FOREIGN PATENT DOCUMENTS

WO  WO 00/38095 A2  6/2000
WO  WO 00/63816 A2  10/2000

OTHER PUBLICATIONS

Kendall P. Hill, Murat N. Tanju, Forfaiting: What Finance and Accounting Managers Should Know; Financial Practice & Education, Fall/Winter, 1998, p. 53-58.*

Hanson, Fay; FCIB's 11th annual global conference: Emerging technologies in global credit and finance; Jan. 2001; Business Credit; v103n1; pp. 61-64.*

Simpson, Paul & Wesley, Charles; What's ahead for top trade banks?; Jun. 2000; World Trade; v13n6; pp. 78-81.*

Lustig, Carole; Forfaiting: A European customer finance technique comes to the U.S.; Nov./Dec. 1998; Business Credit; v100n10; pp. 26-29.*

International Search Report, mailed Feb. 6, 2003, for PCT/AU02/01726 (2 pages).

International Preliminary Examination Report, dated Jun. 11, 2003, for PCT/AU02/01726 (3 pages).

David Clarke, "E-Export Finance is No Dot-Com Wonder but Wonder What EDC Will Make of It?," Policy Options, Sep. 2001 (available at: http://209.85.175.104/search?q=cache:9eiXz5p1NzEJ:www.irpp.org/po/archive/se) (7 pages).

(Continued)

*Primary Examiner*—Stefanos Karmis
*Assistant Examiner*—Samuel S. Weis
(74) *Attorney, Agent, or Firm*—Finnegan, Henderson, Farabow, Garrett & Dunner, L.L.P.

(57) ABSTRACT

This invention concerns forfaiting transactions. In particular it concerns methods of operating a computerized forfaiting exchange to develop forfaiting transactions. In another aspect it concerns a computerized forfaiting exchange. The exchange allows the parties to screen counter party types and asset types, to make the transactions more efficient. It also able to provide assistance in ensuring appropriate documentation is used and is properly completed.

22 Claims, 5 Drawing Sheets